Aug. 4, 1964  S. C. ROCKAFELLOW  3,143,698
PULSE GENERATING FROM A SINGLE-PHASE OR MULTI-PHASE A.C. SOURCE
Filed Nov. 30, 1962

INVENTOR.
STUART C. ROCKAFELLOW, DECEASED
BY LAURA M. ROCKAFELLOW, EXECUTRIX
BY
Woodhams, Blanchard & Flynn
ATTORNEYS

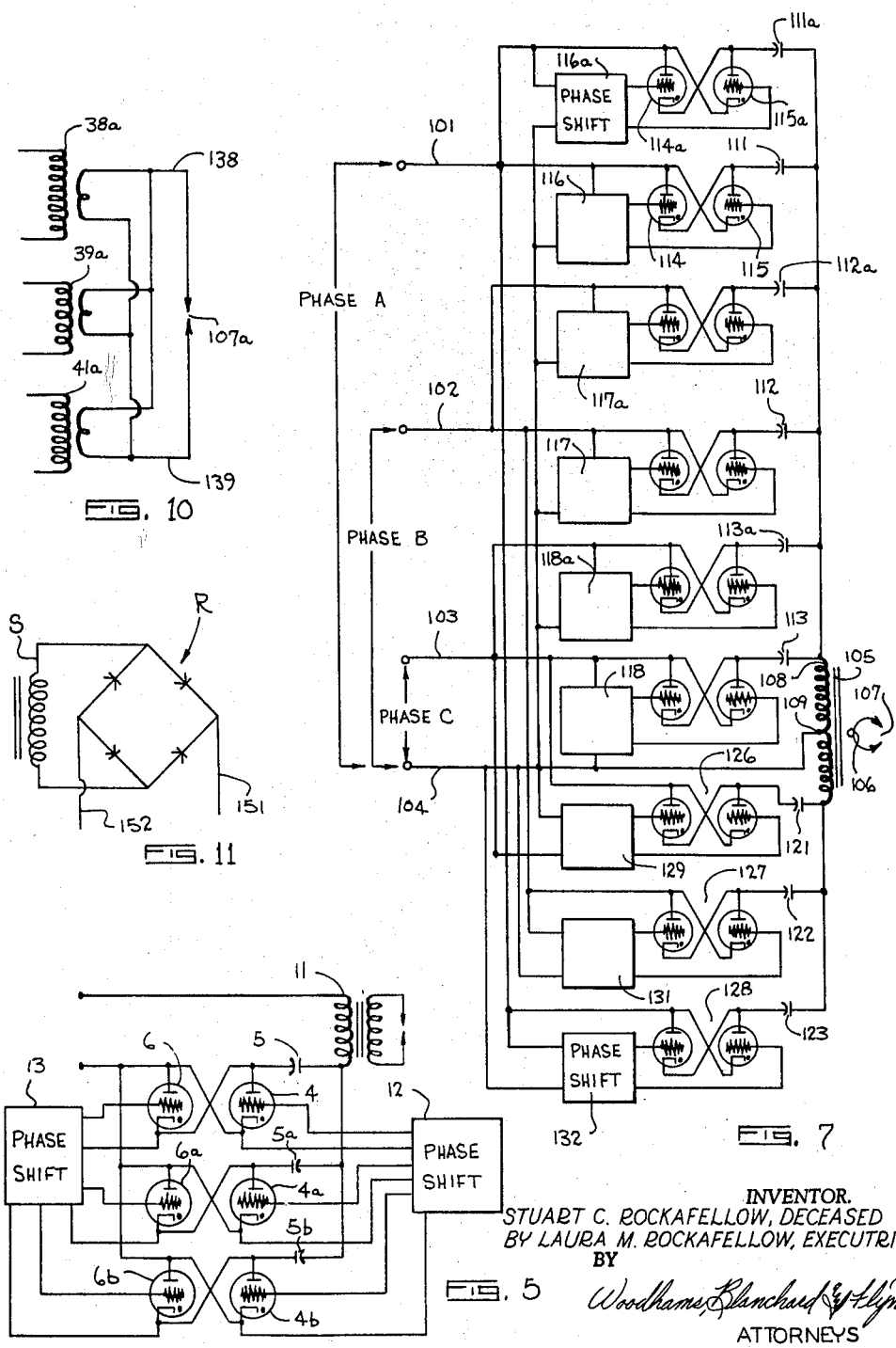

Aug. 4, 1964 S. C. ROCKAFELLOW 3,143,698
PULSE GENERATING FROM A SINGLE-PHASE OR MULTI-PHASE A.C. SOURCE
Filed Nov. 30, 1962 7 Sheets-Sheet 6

$K = 1.5$
$K = 1 + e^{-at_1}$
$K = 1 + e^{-\frac{\pi}{2}R\sqrt{\frac{C}{L}}}$
$V_C$ AT $t = 0$ IS $0$ INVENTOR.
STUART C. ROCKAFELLOW, DECEASED
BY LAURA M. ROCKAFELLOW, EXECUTRIX
BY
Woodhams, Blanchard & Flynn
ATTORNEYS

N = TRANSFORMER TURNS

An Equivalent Circuit for the Circuit of Fig. 16

United States Patent Office 3,143,698
Patented Aug. 4, 1964

3,143,698
PULSE GENERATING FROM A SINGLE-PHASE
OR MULTIPLE-PHASE A.C. SOURCE
Stuart C. Rockafellow, deceased, late of Plymouth, Mich.,
by Laura M. Rockafellow, executrix, Plymouth, Mich.,
assignor to Robotron Corporation, a corporation of
Michigan
Filed Nov. 30, 1962, Ser. No. 242,577
12 Claims. (Cl. 323—18)

This invention relates to circuitry for producing sharp and controllably spaced pulses of power from a source of repetitively reversing polarity wherein the voltages of such pulses are of a magnitude substantially greater than the magnitude of the applied voltage from the source at the instant the pulse is delivered, and particularly to circuitry for delivering short pulses of power from a commerical A.C., source to a load, such as a welding transformer for effecting a welding operation.

This application is a continuation-in-part of my previously filed application Serial No. 22,822, filed April 18, 1960, for "Pulse Generating From a Single-Phase or Multi-Phase A.C. Source," which in turn was a continuation-in-part of my application Serial No. 842,451, filed September 25, 1959, for "Pulse Generating From Single-Phase or Multi-Phase A.C. Source," now abandoned, which in turn was a continuation-in-part of my still earlier application Serial No. 763,725, filed September 26, 1958, for "Pulse Welding From an A.C. Line," now abandoned.

While the circuitry embodying the invention is applicable to a wide variety of specific uses, it has been developed primarily in connection with resistance-welding operations and its present commercial use is primarily in the resistance-welding field. Therefore, circuitry and nomenclature appropriate to the resistance-welding field will be utilized to illustrate the invention but it will be recognized that the choice of such circuitry and nomenclature is for illustrative purposes only and such choice indicates no limitation of the invention.

Inasmuch as the equivalent circuit of an actual circuit embodying the invention will contain resistance, inductance and capacitance, the component or components comprising the load in a given instance will be primarily a matter of which component or components produce the result desired. Normally, however, since resistance is usually present where energy is to be extracted, the load will be at least in part resistive. Thus, the load for welding uses will usually consist of both resistance and inductance.

It has in the past been found useful in a variety of welding operations to pass a plurality of short pulses of power through a welding transformer in order to concentrate the welding heat developed thereby within the junction portion of the welding zone. By using short, discontinous and somewhat spaced pulses of energy, heat can be supplied rapidly to the welding zone without excessively heating the surrounding material. This form of welding has been previously used in a variety of circumstances where it was desirable to confine the heat closely to the weld zone, such as in the welding of aluminum, the welding of relatively thin sheets of metal including sheet aluminum or in the welding of plastic coated metal such as vinyl coated steel sheets.

In the past, however, the generation of short pulses of this nature has either required considerable equipment or the pulses have not been available sufficiently rapidly to carry out the welding operation at a commercially acceptable speed. Particularly, capacitor discharge welders have been utilized to accomplish a type of welding generally similar to the above mentioned but these have been limited to relatively slow production because of the time necessary to charge the capacitors between pulses.

In previous experimental work with this type of power supply, particularly for welding purposes, efforts have been directed largely toward supplying the necessary power at high amperages and at usually line or at the most twice line potentials. The supplying of power to the primary winding of the welding transformer necessitated the handling of such power through the switching apparatus and commercially available switching devices, such as ignitrons, have not been and are not yet capable of handling the amperages required under these conditions to deliver the desired energy to the welding zone in the short periods of time desired. For example, a "B" type ignitron is not recommended for use with over 1200 amperes of instantaneous current where the supply voltage is at 750 volt peaks whereas in the commercial applications of the present invention if the instantaneous power supplied were supplied at line potential even with 750 volt peaks a current of several thousand amperes would be required. Accordingly, prior attempts in this direction have either resulted in relatively long heat "on" periods, such as in the patent to Strickland No. 2,440,309, or they have resulted in a relatively slow operation such as in common capacitor discharge welding.

Further, the usual capacitor discharge welding circuit requires a switch in the discharge circuit of the capacitor and the presence of such a switch limits the magnitude of current which can be handled. Since such capacitors are normally charged only to line potential, such limiting of the current which can be handled automatically limits the total energy which can be delivered in a given time interval to the weld zone.

In the experimental work culminating in the present invention, recognition was made of the fact that power (heat in the case of welding applications) is a product of voltage and amperage. Thus, if the power supplied to the primary winding of the welding transformer and controlled by the switching apparatus can appear in greater part as voltage, then the amperage can be diminished correspondingly. By so doing, it becomes possible to effect the desired switching by ignition circuits utilizing conventional components which renders the circuits commercially acceptable from a cost standpoint. Then, by supplying such power through very short time periods, many previously unachieved and unexpected advantages have been obtained as a result of the present invention. That is, the present invention has achieved not only the previously recognized but commercially unattainable advantages incident to the use of short pulses but it has also brought about the attainment of many advantages which were completely unexpected.

Therefore, the circuit of the present invention provides extremely short pulses of power in a desired load but does so within the limits of commercially available switching equipment. The invention accomplishes this operation by employing appropriate switching circuits and energy-storage elements such that the equivalent circuit-driving voltage is made to appear much larger than the equivalent circuit source voltage from the commercial power lines.

Thus, as applied to a welding operation, the invention comprises periodically supplying an ordinary alternating current from a commercial source, such as a 460 volt source, to a self-extinguishing circuit which includes the primary winding of a welding transformer, the self-extinguishing circuit being arranged to permit current flow for only very short periods of time, such as one millisecond. By amplifying appreciably, as three to five times the source voltage, the voltage applied to said primary winding, the energy applied from the source is concentrated at the primary winding of the welding transformer into high voltage pulses of short duration. These pulses then appear in the secondary circuit as corresponding short pulses of very high momentary amperages, such as 50,000 to 100,000 amperes.

This procedure, then, for welding, results in and constitutes dividing the electrical energy applied to a given welding situation into extremely short increments while simultaneously increasing the amperage thereof sufficiently to provide a desired amount of heat within a total welding period of the same or less duration than that as previously known. The delivery of a very high amperage through the zone of discontinuity that is to be welded in an extremely short period of time concentrates the welding heat at such zone of discontinuity sufficiently that the area immediately adjacent to said zone is very quickly heated to a welding condition without, in many cases, appreciably heating the surrounding metal.

Of the first order of importance, among these previously unattained advantages, may be listed an apparently substantial diminishing of the amount of energy required for a given weld and the consequent diminishing of the load placed upon the power lines to accomplish a given item of welding work. This appears to result from the extremely high concentration of welding heat at the exact point of the weld which in turn results in delivering energy, and therefore, heat to said welding zone at an extremely high rate of speed with respect to the rate at which said heat can dissipate through the material adjacent to and surrounding the weld zone. Thus, a much greater proportion of the heat actually developed in the material being welded during a given operation, and consequently a much greater proportion of the energy actually utilized in and by the operation, is effective in raising the temperature of the work to the fusing level and thus a much higher efficiency in the welding operation is obtained.

A further advantage of the present invention constitutes a great reduction in the size of the welding transformer required. For example, in one particular welding service for aluminum which required a 200 kva. transformer when supplied by ordinary commercial alternating current pulses at 60 cycles per second and 240 volts, the same welding service could be successfully carried out according to the present invention from the same commercial source by a transformer of such size that it would if used in a conventional manner particularly if used with a 60 cycles per second alternating potential source, be considered a 20 kva. transformer. This reduction in the size of the welding transformer required results in a substantial reduction in the cost of the welding equipment required for a given service. It further results in greater ease of handling such equipment, particularly where such a transformer is utilized in gun-welding apparatus.

Another previously unattained advantage of this type of welding is that it is possible to carry out an effective welding operation with only relatively light pressure on the welding electrodes. This results from the fact that electrode pressure is primarily required to prevent the electrodes from moving apart in response to electrical repelling forces which develop upon application of the welding current. With the process and apparatus of the present invention, however, these repelling forces are not developed in the electrodes to the extent that they appear in welders conventionally energized partly for the reasons that (a) the power is applied for such a short period of time that it cannot appreciably overcome the mechanical inertia of the electrodes and (b) partly because the actual energy supplied thereto appears to be somewhat smaller than is utilized by a conventional welding current.

A still further advantage, previously unsuspected, has appeared in the substantially complete elimination of the problems usually resulting from the reactance effects in the throat of the welding machine. Where an ordinary 240 volt, 60 cycle, commercial source has been applied to the primary winding of the welding transformer, it has in the past been necessary to calculate very carefully the output of the secondary winding of the welding transformer in relation to the size, position and length of the conductors between the secondary winding of the welding transformer and the welding electrodes, particularly, as said conductors constituted the throat of the welding machine. Inasmuch as the reactance effects are a geometric function of the length of such throat, it has been found that where a satisfactory potential was supplied to a welding machine having, for example, a 12 inch throat, the extension of such throat to 18 inches without appropriate modification in the output of the welding transformer might well, and often does where conventional welders are used, reduce the potential appearing in such latter case between the welding electrodes so much as to make a satisfactory weld impossible. However, in apparatus embodying the present invention, while similar inductance does develop and is present in the throat of the welding machine, the other electrical characteristics of the apparatus are such that they are self-compensating and the changing inductance in said throat, whether arising because of a change in length of the throat, because of introducing workpieces into the throat or for other causes, has no appreciable effect on the value of welding current flowing between the welding electrodes.

A further and wholly unexpected characteristic of the present invention is that it appears to place in effect only a resistance load on the supply power lines in the same manner as though a D.C. potential were applied to the conductors leading to the welding electrodes. Thus, the substantial lagging effect of conventional welders is eliminated and no power factor correction is required.

Still further, it has been found that the metallurgical effects obtained by the welding system of the present invention produce a much finer grain structure in and near the region of the weld than was previously believed possible. It has been recognized for many years that a weld zone having fine grain structure was highly desirable. It was known from previous conventional welding that the somewhat prolonged heating effects cause rapid growth in the grain structure of the metal immediately surrounding the weld zone and this causes a brittleness in this area which will often break even while the weld itself remains connected. However, while this situation has long been recognized, there was no way known previously for achieving this admittedly desirable grain structure. Tests carried out show that in welds produced according to the present invention the grain structure remains fine and that welds produced by this method are in consequence of substantially greater strength and much less brittleness than has been accepted as inevitable in the past. In instances where, because of the type of metal involved or for other reasons, grain growth has not been a noticeable problem, the weld obtained by the method of the present invention is still of at least equal strength to welds obtained by previous methods and in many cases the weld of the present invention shows improved strength to welds made by conventional methods.

In view of these many advantages as set forth above, as well as many others, the novel concept in the welding method hereinafter set forth and the circuitry hereinafter described by which said method may be practiced are believed to be a substantial and basic advance in the welding art over previously known methods and circuitry.

In addition, there is a large number of places for utilizing spaced pulses of power, in addition to the welding field, to which the circuitry of the present invention is applicable. For example, the use of such pulses in induction heating operations has long been recognized as being desirable in order to maximize the functioning of the inductive circuitry and minimize the total amount of electrical energy required to perform a given operation.

Accordingly, the objects of the invention include:

(1) The provision of circuitry for use with a commercial alternating current source for creating very short pulses having a potential of magnitude several times the magnitude of the maximum supply potential.

(2) The provision of circuitry for drawing energy from a commercial alternating current source, storing same and delivering same to a load in short bursts of high-peak power while controlling same through conventional switching devices.

(3) The provision of circuitry for supplying from a commercial alternating current source pulses of sufficiently low amperage that the current involved can be handled by commercially available switching mechanism, such as ignitrons, but of such voltage that a large amount of energy can be delivered to a desired load in a very small period of time, such as 1 or 2 milliseconds.

(4) The provision of circuitry for welding capable of producing welds that are of as great or better strength than welds previously known.

(5) The provision of circuitry for creating a pulse adaptable for electric welding which circuitry is applicable equally for single-phase uses and for multi-phase uses.

(6) The provision of circuitry for creating pulses particularly adaptable for electric welding uses, wherein variation in reactance in the secondary winding of the welding transformer will be automatically compensated so that previously known current compensating devices are thereby rendered unnecessary.

(7) The provision of circuitry for creating a pulse which utilizes both stored energy in a capacitor and stored energy in an inductance acting in series with each other to produce a potential substantially in excess of the line potential operating therewith whereby a burst of energy having high-peak power may be supplied to a resistive load.

(8) The provision of circuitry for resistance welding which will effectively and efficiently weld both ferrous and non-ferrous metals, the latter particularly including aluminum, magnesium and the copper alloys.

(9) The provision of circuitry, as aforesaid, wherein the pulse width can be controlled with an extremely high degree of accuracy.

(10) The provision of pulse-generating circuitry of extreme simplicity but which will nevertheless function effectively.

(11) The provision of a pulse-generating circuit, as aforesaid, wherein the voltage of the pulses delivered in one portion thereof is substantially in excess of the maximum voltage supplied by the power source.

(12) The provision of energy-transfer circuitry including an appropriate switch, a switch controller closing the switch when desired and opening the switch when current therethrough becomes substantially zero, capacitive and inductive energy-storage devices and a resistance in which energy is dissipated, all supplied from a commercial alternating current source and arranged to supply to said resistance energy in short bursts of high-peak power.

(13) The provision of a pulse-generating circuit, as aforesaid, which is applicable to a multi-phase source as well as to a single-phase source.

(14) The provision of a pulse-generating circuit, as aforesaid, which will operate with sufficient rapidity that a large number of pulses can be produced during each half-cycle of a commercial A.C. power source, whether single phase or multi-phase.

(15) The provision of a pulse-generating circuit, as aforesaid, which will be economical to construct initially and will require only a minimum of maintenance.

(16) The provision of a pulse-generating circuit, as aforesaid, which will be applicable to energize a wide variety of specific loads, including both resistive and inductive loads.

(17) The provision of a pulse-generating circuit, as aforesaid, which will be applicable to a wide variety of specific uses, including resistance welding operations.

Other objects and purposes of the invention will be apparent to persons acquainted with apparatus of this general type upon reading the following disclosure and inspecting the accompanying drawings.

In the drawings:

FIGURE 5 is a diagrammatic representation of circuitry illustrating a modification of the invention applicable to single-phase power for obtaining multiple output pulses for each half-cycle of input power.

FIGURE 7 is a diagrammatic representation of a circuit embodying the invention and adapted for use with a Y-connected, multi-phase source.

FIGURE 10 shows a fragment of circuitry modifying the circuit of FIGURE 6 for utilizing a plurality of standard transformers.

FIGURE 11 shows a modification to obtain uni-directional output pulses.

In General

Figure 1:
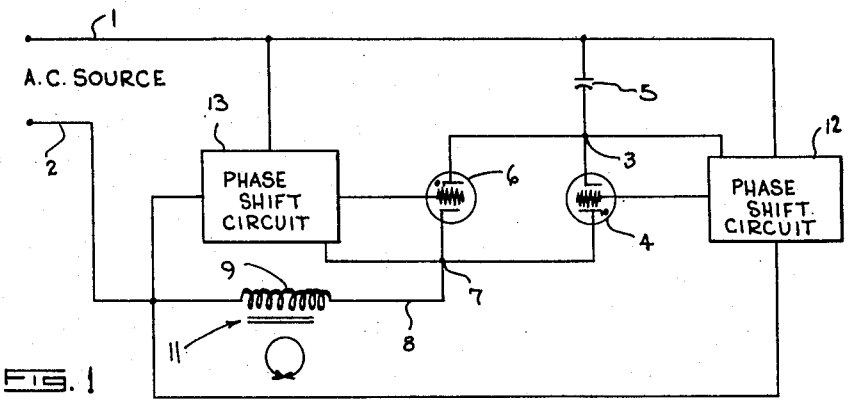
FIGURE 1 is a schematic representation of a circuit embodying the invention and adapted for use with a single-phase source.

Broadly, the method concept of the invention consists first in supplying energy from a source of periodically reversing potential, such as an ordinary commercial A.C. source, next withdrawing such energy into storage devices, in short pulses of sufficiently low amperage that they can be controlled by conventionally available switching equipment but at high enough voltages, usually several times the voltage of the power source, that each pulse will deliver a substantial amount of energy at high-peak power. Said energy pulses are then utilized as desired. In welding service, they are transformed into corresponding pulses of lower voltage and higher amperage and delivered to the welding zone. A further method concept of the invention therefore includes the supplying of energy to the welding zone in very short, as one to two millisecond duration increments of energy wherein said energy is of extremely high-peak power in order that the temperature of the weld zone is raised at such a rapid rate that relatively little of the energy, and the heat resulting therefrom, will have time to dissipate during the period of such heating appreciably into the material surrounding said weld zone. Thus, the heating of the metal is confined primarily to that in the immediate vicinity of the weld zone, probably not a monomolecular layer but certainly something closely approximate thereto, and the fusion of such metal is completed before appreciable heat dissipates into the metal behind and beyond the immediate weld zone. This produces a number of advantages, among which the most obvious and immediate are the minimizing of the energy actually required to produce a satisfactory weld and minimizing the deleterious effects on the metal of excessive heating beyond the zone immediately concerned with the actual fusion of the parts to be joined.

As to the circuit concept, in general the invention provides a circuit which operates from a commercial A.C. power source which couples the load and power source together effectively for producing short energy pulses of high instantaneous value in said load. This is basically accomplished by means of an appropriate switch, the term "switch" being here used in its most general sense, and a suitable R-L-C circuit. The R-L-C circuit is one in which all three elements play a significant part such that neglecting any one thereof will cause the circuit not to produce the desired results. One realization of this concept results in an equivalent circuit which is a series circuit of resistance, inductance, capacitance, a switch and the power source. In order to achieve the desired pulse of energy in the load, the various circuit components must be chosen appropriately in a manner set forth in more detail hereinafter but wherein one important and controlling relationship is expressed by the equation:

$$K \cong 1 + e^{\left(-\frac{\pi}{2}R\sqrt{\frac{C}{L}}\right)}$$

wherein the value of K lies somewhere between 1 and 2 and preferably between about 1.33 and 1.8.

Since the values of R, L and C in the above equation are the values of the elements in the equivalent circuit, the actual circuit will generally consist of other values which are obtained from transforming the equivalent circuit to the actual circuit.

It will be apparent to those skilled in the art that there are a substantial number of actual circuits which are adequately approximated by the simplified equivalent circuit further discussed hereinafter such that they will achieve the objectives and purposes of this invention.

One specific example of the apparatus concept of the invention provides a circuit in which one side of a capacitor is connected to one of the principal electrodes of each of a pair of reversely connected gas-filled tubes, the aforesaid principal electrodes being of opposite polarity. The other principal electrodes of said gas-filled tubes are connected to one end of a load, such as the primary winding of a welding transformer. One side of a source is connected to the other side of said capacitor and the other side of said source is connected to the other side of said load. Suitable circuitry, such as phase-shift circuitry, is connected between the cathode and the control electrode of each of the gas-filled tubes for determining and controlling the portion of the respective half-cycles of an A.C. potential during which the respective tubes are conductive.

Detailed Description

The method of the invention while applicable to many specific loads, may be best understood by reference to one specific load for purposes of discussion. Hence, reference will be made to the method in terms of its application to welding but this is only for convenience and definiteness in description. With such understanding, it may be said that the method of the invention consists primarily in rearranging the energy supplied from the source and delivering it at a potential of several times the potential of the source to the primary winding of the welding transformer in pulses of extremely short duration, such as approximately 1 millisecond. More specifically, the method consists of supplying potential from an ordinary commercial A.C. source at line value to switching and voltage multiplying means for successive periods of time. Said periods are each no longer than one-quarter of a cycle of the supply but they are preferably of much shorter duration, such as of the order of from 100 to 4000 microseconds. The current flow thus directed through said voltage multiplying means is caused to create a potential across an inductance of a magnitude of several times that of the applied voltage. By creating a very high potential across said inductance, it is possible to use ignitrons for the switching apparatus, it being feasible for ignitrons to handle high voltages, such as potentials of several thousand volts, whereas it is not feasible for ignitrons to handle a corresponding amount of energy when same appears in terms of high amperages.

The high voltage pulse thus appearing in said inductance is inductively converted into a pulse of high amperage at relatively low voltage and thereupon conducted to the welding zone.

By spacing said pulses sufficiently apart, the duty cycle of the apparatus used for handling same is held within acceptable bounds. In fact, insofar as the welding transformer is concerned, it becomes possible to utilize a much smaller transformer than has been needed for conventional systems as more fully brought out elsewhere herein.

By thus applying a large amount of current, such as 50,000 amperes, to the welding zone this sudden and sharp concentration of current, even though for only a short period of time, at the area of discontinuity in the welding zone effects an extremely rapid heating of the material to welding condition. However, by limiting the duration of such power application to the welding zone, avoidance of damage to the workpieces is assured. However, the zone of such heating is concentrated in a relatively small area immediately adjacent the discontinuity between the two parts being welded and the metal surrounding said zone remains relatively cool. Thus, when the pulse terminates the heat from the welding zone tends to dissipate rapidly into the surrounding metal with the result that the welding area is cooled rapidly. Even if several pulses of energy are supplied to a given welding zone, this same action occurs as evidenced by the fact that the workpieces seldom exceed 100 or 125 degrees F. and can be grasped by hand immediately after such a weld is completed, but within a very few seconds following the completion of the weld the workpieces increase in temperature to a point where they cannot be held by hand.

Viewing this process metallurgically, it will be seen that an extremely rapid heating and cooling of the material being welded will effect a completion of such weld before sufficient time has been provided to permit appreciable grain growth within said material. Thus, the welded parts will be effectively and solidly welded but there will be relatively little grain growth in the material immediately surrounding the weld nugget. For example, as applied to the welding of steel, heat is supplied with sufficient rapidity to the weld interface that the metal therein will be raised from the ferrite range to the austenitic range in such short periods of time, such as the 100 to 4000 microseconds above mentioned, that the metal immediately around the weld interface will remain substantially in the ferrite condition. The supply of heat is then terminated and the temperature will drop accordingly with sufficient rapidity that only a very little grain growth is effected. Even the subsequent and repeated applications of power pulses, the rapid raising and lowering of temperature is carried out without appreciable grain growth. Further, it appears, although this is not clearly established experimentally, that the alternate application and withdrawal of power actually has some tendency to break up such grain growth as does occur.

Reference will now be made to certain specific apparatus for carrying out the above method, both for a further understanding of said method and for a disclosure of the apparatus aspects of the invention.

Referring now to FIGURE 1, there is shown an A.C. source supplying alternating potential to a pair of conductors 1 and 2. It should be noted that the power source has an internal impedance which must be considered although in some cases said internal impedance can be neglected. In general, said power source may be replaced with an appropriate equivalent circuit so that when said alternating potential is referred to herein and particularly in connection with the detail analysis appearing hereinafter it should be recognized as being the equivalent circuit alternating potential. This makes it possible to refer to an alternating potential which is independent of the load on the power lines 1 and 2. The conductor 1 is connected to one terminal of a capacitor 5 of appropriate size, the other terminal of said capacitor being connected to a junction point 3. The junction point 3 is connected to one side of an appropriate switch which in this instance is the cathode of a first gas-filled electric discharge tube, as a thyratron or ignitron, indicated at 4, and the anode of a second, similar, gas-filled tube 6. The other side of said switch, here the anode of the tube 4 and the cathode of the tube 6, is connected to a junction point 7 and said junction point is connected by a conductor 8 to one end of an inductance which here is also the load and comprises the primary winding 9 of a welding transformer 11. The full load, of course, includes also the inductive and resistive components of said transformer primary winding as well as the corresponding components of the transformer's secondary circuit. The other end of the primary winding 9 is connected to the conductor 2.

For operating said switch between the points 3 and 7 above mentioned a switch controller is required to cause this circuit to operate in a desired manner. Here gas-filled switches are used, namely, the ignitrons above mentioned, and accordingly it is convenient to use phase-shift circuits as the switch controllers. Thus, a suitable phase-shifting circuit 12 of any conventional type is powered from the conductors 1 and 2 and its output is connected across the cathode and control electrode of the tube 4. A further phase shift circuit 13 is similarly powered from the conductors 1 and 2 and its output is connected across the cathode and the control electrode of the tube 6. Since a vital portion of the invention includes the quantitative relationships provided between the several R, L and C components of the circuits, as above mentioned briefly in the general discussion, and since the best understanding of these quantitative relationships will be promoted by a study of the equivalent circuit representing a given actual circuit, attention will now be directed toward such an equivalent circuit and the mathematical relationships controlling same will be set forth.

Figure 13:
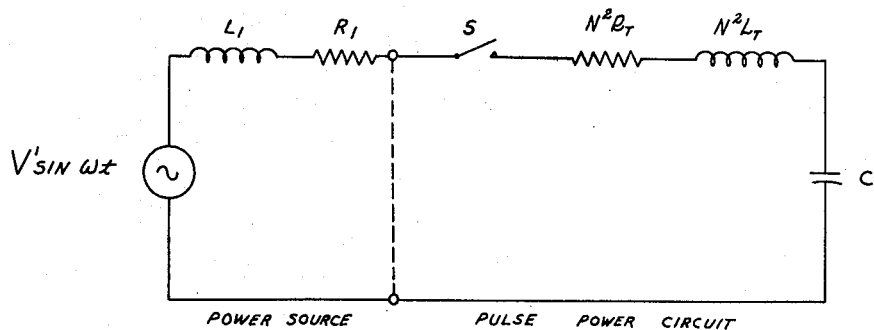
FIGURE 13 is an equivalent circuit embodying the invention and illustrating the components and symbols hereinafter appearing.

Referring now to FIGURE 13, this is an equivalent circuit for the power source and the circuit of FIGURE 1. This circuit is an adequate representation of the power source and the circuit of FIGURE 1 because its use provides good predictions of the operation of the actual circuit. In FIGURE 13 the power source is represented by an equivalent circuit voltage generator $V'$ sin $\omega t$, a series inductor $L_1$ and a series resistor $R_1$. In some cases the source will look capacitive or it may have a negligible reactive component but neither of these cases will influence the analysis or significantly influence the results, nor will $R_1$ going to zero cause any difficulties. On the other hand the equivalent impedance of the source cannot become too large or the desired high power cannot be extracted from the power source.

Still referring to FIGURE 13, the pulse power circuit in this equivalent circuit consists of an idealized switch in series with a resistance $N^2R_T$, an inductance $N^2L_T$, and a capacitor C, all connected in series with the series equivalent circuit of the power source. $R_T$ is the total resistance of the transformer and load as reflected to the transformer secondary, $L_T$ is the total inductance of the transformer and load as reflected to the transformer secondary (except magnetizing inductance) and N is the turns ratio of the transformer. Reflecting the total resistance and total inductance to the primary winding of the transformer (the values become $N^2R_T$ and $N^2L_T$. Since capacitive effects in the transformer and load of the FIGURE 1 circuit can be ignored, the capacitance C in FIGURE 13, has, in effect, the value of the capacitor 5 in FIGURE 1. The idealized switch for the purpose of the following equations is assumed to have zero resistance when closed and to have infinite resistance when opened, to open or close at any desired time instantaneously and with no time delay whatever. In operation, such a switch, paralleling the ideal operation of the ignitrons above described, will close at any desired time and will then remain closed until the current which begins to flow through the switch when the switch is closed attempts to change direction, that is, the opening time of the switch is when the current through the switch first goes to zero after it has started flowing in one direction or the other. It does not matter in which direction the current first begins to flow through the switch but it cannot reverse without opening the switch and the interval from closing of the switch to the opening of the switch is entirely dependent upon the circuit exterior to the switch.

Figure 14:
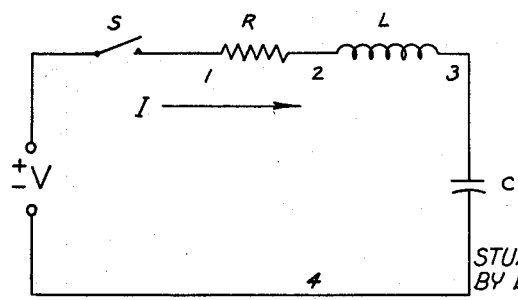
FIGURE 14 is a simplified equivalent circuit wherein all values have been consolidated into single elements.

For further anaylsis purposes, the circuit of FIGURE 13 will be further simplified and this final simplified equivalent circuit is shown in FIGURE 14. Here all of the resistance has been combined into one resistor R, all the inductance into one inductor L and all capacitance into one capacitor C. Further the A.C. source has been replaced by a D.C. source of magnitude V which may have either polarity as chosen to correspond to a selected wave of the A.C. source. The reason that the actual sine wave source can for analysis purposes be replaced with an alternating polarity constant source is that the idealized switch S in the simplified equivalent circuit is only closed for a very small fraction of a cycle of the sine wave source and therefore for practical purposes the sine wave source appears to the simplified equivalent circuit as nearly constant in magnitude for the time the switch S is closed.

In analyzing the simplified circuit, the following symbols will be used: the instantaneous voltage across the resistance R will be written as $$v_{12} \text{ or } v_{21}$$

wherein $v_{12}$ will be positive provided that point 1 is more positive than point 2, $v_{21}$ will be positive that point 2 is more positive than point 1, and $v_{12}=-v_{21}$. Similarly for the other voltages. The current will be positive if it flows in the direction indicated by the arrow. Further, we shall use the convention of positive current flow, that is, current flows out of the positive terminal of a voltage source.

We shall represent the various voltages as:

$v_{12}$ The instantaneous voltage drop across the resistance R;
$v_{23}$ The instantaneous voltage drop across the inductance L;
$v_{34}$ The instantaneous voltage drop across the capacitance C;
$v_{41}$ The instantaneous voltage drop across the source V.

The symbol $q$ will be used to represent the instantaneous charge on the capacitor C.

Now the equations that describe the operation of this circuit are:

$$v_{14}=\pm V \quad (1)$$

$$i=\frac{(v_{14}-V_{34})}{L\beta}e^{-at}\sin \beta t \quad (2)$$

where:
$\beta=\omega=2\pi f$
$f$=resonant frequency of R-L-C circuit
$i$=instantaneous current in the loop
$v_{14}$=driving voltage
$V_{34}$=initial voltage on the capacitor before the switch is closed, i.e., when $t=0$ $$(V_{34})=V_c=\text{magnitude of the initial voltage on the capacitor} \quad (3)$$

$$a=\frac{R}{2L}=\text{damping factor} \quad (4)$$

$$\beta=\sqrt{\frac{1}{LC}-\frac{R^2}{4L^2}} \quad (5)$$

We shall normally neglect
$$\frac{R^2}{4L^2}$$
in $\beta$ so that $$\beta \cong \sqrt{\frac{1}{LC}} \quad (6)$$

In other words we will normally be using a small enough resistance so that neglecting
$$\frac{R^2}{4L^2}$$
gives good results.

The above equations and the following equations are only valid for $$\frac{1}{LC} > \frac{R^2}{4L^2}$$

or $$\frac{2}{R}\sqrt{\frac{L}{C}} > 1 \quad (7)$$

This is equivalent to saying that we are only analyzing the under-damped case for the equivalent circuit. In fact this is the only operational case in which we are interested.

In our simplified equivalent circuit the switch S opens at the first current zero following closure. Therefore by looking at Equation 2 we can see that the value of $t$ for which the switch opens is when $$t=\frac{\pi}{\beta} \quad (8)$$

Thus the time range for all equations is $$0 \leq t \leq \frac{\pi}{\beta} \quad (9)$$

Now the various instantaneous voltages may be expressed as $$v_{12}=\frac{(v_{14}-V_{34})R}{L\beta}e^{-at}\sin \beta t \quad (10)$$

$$v_{23}=(v_{14}-V_{34})e^{-at}\left[\cos \beta t - \frac{a}{\beta}\sin \beta t\right] \quad (11)$$

$$v_{34}=V_{34}+(v_{14}-V_{34})\left[1-e^{-at}(\cos \beta t + \frac{a}{\beta}\sin \beta t)\right] \quad (12)$$

These equations represent what happens during the time the switch is closed. When the switch is open there is no current flow so that the voltage drop across the resistance is zero, also since the current is not changing through the inductance, the voltage drop across it is zero. But in general the capacitor is left with a charge on it and therefore it retains a voltage drop. The pulse power circuit operates such that the voltage source alternates for each operation of the switch. Therefore if $v_{14}$ is positive for closure 1 of the switch, then $v_{34}$ is positive when the switch opens. $V_{34}$ for switch closure 2 is equal to $v_{34}$ at the time the switch opened following closure 1. This then is the initial condition for closure 2. For closure 2 the source potential $v_{14}$ is negative so both $v_{14}$ and $V_{34}$ add. Thus in Equation 12 the quantity $(v_{14}-V_{34})$ has the value $(-V-V_{c_1})$, where $V_{c_1}$ is the magnitude of the initial voltage on the capacitor at the time $t=0$ for closure 2, similarly for the other equations. This procedure is continued for each additional operation of the switch.

It will be noted that $e^{-at}$ is an important factor in all equations. In order that we can conveniently describe certain operations in the pulse circuit a factor based on this exponential relationship is useful. It will be developed in the following discussion. At the time that the switch is turned off the current reaches its first zero. In Equation 2 it is readily seen that this occurs at $$t=\frac{\pi}{\beta}$$

To find what the voltage on the capacitor will be at this time, reference is made to Equation 12, which describes the capacitor voltage and wherein there is a sine and a cosine term. At the time the switch opens it is seen that only the cosine term is non-zero, in fact it is $-1$. Therefore we have a multiplying factor $$K=1+e^{\left(-a\frac{\pi}{\beta}\right)} \quad (13)$$

This may be expressed in terms of L-R-C as $$K=1+e^{\left(-\frac{\pi}{2}R\frac{1}{\sqrt{\frac{L}{C}-\frac{R^2}{4}}}\right)} \quad (14)$$

and approximately as (in most cases of interest)

$$K \cong 1+e^{\left(-\frac{\pi}{2}R\sqrt{\frac{C}{L}}\right)} \quad (15)$$

Since K is only a function of the constants R-L-C, for a given apparatus it is also a constant. Nevertheless, it is a parameter which is adjusted to obtain the desired performance in a given instance. With the value of K given, we may now calculate the voltage on the capacitor at the end of a current pulse in terms of the source voltage and the initial voltage on the capacitor at the beginning of the current pulse switch closure time. Thus $$v_{34}\left(\text{at } t=\frac{\pi}{\beta}\right)=V_{34}+(v_{14}-V_{34})K \quad (16)$$

or $$=V_{34}+(\pm V-V_{34})K \quad (17)$$

The plus or minus is determined by the particular switch closure cycle. Because of the nature of the pulse circuit, it will always be found that the signs are such that the magnitude of V and magnitude of $V_{34}$ add together inside the parentheses of Equation 17.

At this point it seems desirable to relate the equivalent circuit to an actual circuit. For this purpose definition will be made of what is means by load, namely any element (R, L or C) or elements that the desired output is present in or across. In general the objective of this invention is to transfer energy from any energy source to some load. Further the load will usually have an equivalent circuit with some resistance since the only way we can convert the input energy into heat or work is to have the load have a resistive component.

Figure 16:
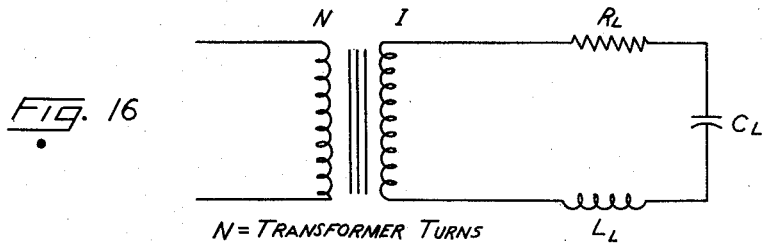
FIGURE 16 is an equivalent circuit of a typical transformer and load illustrating symbols used in the hereinafter presented equations.

In some applications the actual load may be purely resistive, but the resistance may not be of the proper value to operate in an optimum manner in the circuit and a transformer may be used to change the magnitude of the resistive component. Further, the load may be resistive and capacitive or resistive and inductive or all three may constitute the load. Again the impedance may not be appropriate for the circuit and a transformer may be employed. Thus a short discussion of the transformer, a typical equivalent circuit, and the transformation of the load are important to an understanding of the present invention and this discussion follows:

In FIGURE 16 is shown a circuit of a transformer and a typical load, said load comprising resistive ($R_L$), capacitive ($C_L$), and inductive ($L_L$) components. The transformer shown is non-ideal and hence has each of resistive, capacitive and inductive components in its true equivalent circuit.

Figure 17:
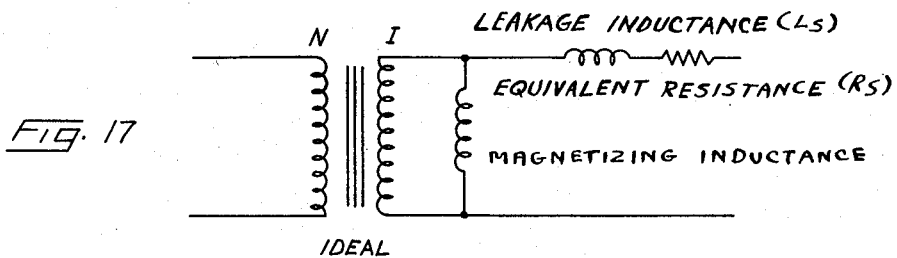
FIGURE 17 is a figure similar to FIGURE 16 showing the equivalent circuit of a typical transformer showing magnetizing inductance, equivalent resistance and leakage inductance.

However, for the purposes of the following discussion the transformer effects which are included in the equivalent circuit will be limited to the resistive and inductive components. This can be done because in most applications the capacitive effects will be small and the predictions will be equally good without the consideration of the capacitive components. A typical and adequate equivalent circuit for a conventional transformer, wherein all leakage inductance and transformer effective resistance is reflected to the secondary, is shown in FIGURE 17 and comprises an ideal transformer with the transformer equivalent resistance ($R_S$) a series element and a series inductive component ($L_S$) which represents the actual transformer leakage inductance.

Figure 18:
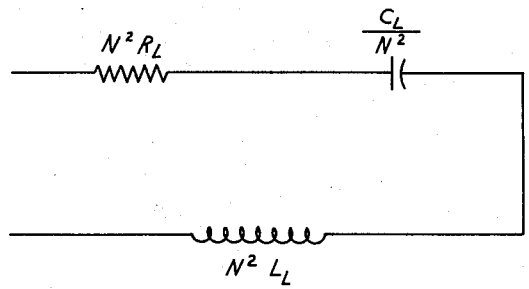
FIGURE 18 is an equivalent circiut for the circuit of FIGURE 16 and further illustrating the symbols used in the said equations.

Another inductive component which is of importance in many circuits is the magnetizing inductance (FIGURE 17) which is here reflected to the transformer secondary and is shown in parallel with the secondary winding of the transformer. In the equivalent circuit here used this magnetizing inductance is neglected because it has a negligible effect, the leakage inductance and series resistance being the total effects referred to the secondary. Since the ideal transformer is a device that has no losses and that transforms voltages as N, currents as 1/N, resistances and inductances as $N^2$, and capacitances as $1/N^2$, the actual transformer and its load can be for analysis purposes replaced by an equivalent circuit which does not contain a transformer. The equivalent circuit for the circuit of FIGURE 16 is shown in FIGURE 18. This is the equivalent circuit as seen looking into the two terminals on the primary and employing the assumptions made above, namely, neglecting transformer capacitance effects and magnetizing inductance. The corresponding equivalent circuit for the circuit of FIGURE 17 would be the same except that the resistance would be $N^2R_S$ and the inductance would be $N^2L_S$. For example, the circuit of FIGURE 1 has a load which is a welding transformer with resistance and inductance in the secondary. This will have a simplified equivalent circuit consisting only of resistance and inductance. Thus, in deriving an equivalent circuit for the circuit of FIGURE 1, utilizing the equivalent circuits for a load and a transformer as shown in FIGURES 16 and 17, in order to arrive at the circuit shown in FIGURE 13, $R_T$ equals the sum of $R_L$ and $R_S$ and $L_T$ equals the sum of $L_L$ and $L_S$.

Returning now to the discussion of the load and the equivalent circuit as related to the actual circuit, in the case of a welding circuit, the actual load (the place where energy is to be dissipated as heat) is some fraction of the resistance load on the transformer secondary. This load resistance is some portion of the resistance in the equivalent circuit. In any calculation of actual load energy or power only the equivalent resistance that corresponded to the actual load resistance would be used.

In the discussion above relating to the equivalent circuit, voltages were calculated for the different elements. These refer to the total series resistance, total series inductance, and total series capacitance. In the actual circuit these elements may be divided up and part will be in the power source, some in the load and so on. Therefore one cannot directly say that $v_{12}+v_{23}$ is, for example, the voltage across the primary of the welding transformer, for some of the equivalent circuit inductance and resistance may be associated with the power source. Thus the actual primary transformer voltage would be something somewhat less than $v_{12}+v_{23}$. However, since in most applications, the impedance of the power source is small compared to the load, we will find that the voltages as calculated in the equations above can be used to obtain good approximations for the voltages in the actual circuit without a subdividing of the voltages.

The current as calculated above is of course a series current and it flows through each component in the simplified equivalent and is the same for each.

Continuing, now, the quantitative analysis which will govern circuit designs, there are some additional equations which can be derived with suitable assumptions which gives us information on what effect each component in the circuit has on circuit performance. However, one reservation needs to be pointed out, namely, that these equations involve some major approximations such that for certain choices of parameters the equations do not give wholly accurate numerical answers, even though for other selections of parameters the numerical answers give good engineering results. Nevertheless, these equations in all cases still give a good indication of what the trend is in the change of the circuit performance when the various parameters are adjusted and are accordingly still useful. The conclusions which these equations indicate are significant in verifying the experimental performance of the present invention.

Assumptions: Using the equivalent circuit of FIGURE 14, assume a steady state initial voltage has been reached:

$$\beta \cong \frac{1}{\sqrt{LC}}$$

$I_{ss}$ peak primary = peak current in transformer primary, steady state initial voltage conditions $$I_{ss} \text{ peak primary} \cong V\sqrt{\frac{C}{L}} \left( \frac{1}{\sin h\left(\frac{\pi}{4}\sqrt{\frac{C}{L}}\right)} \right) \quad (23)$$

$V_{c_{ss}} \cong$ The magnitude of the initial voltage on the capacitor under steady state conditions. This is the peak capacitor voltage.

$$V_{c_{ss}} \cong V\left( \frac{1}{\tan h\left(\frac{\pi}{4}R\sqrt{\frac{C}{L}}\right)} \right) \quad (24)$$

Assuming a transformer is present, the operation can be described in terms of the secondary inductance and the secondary resistance (simulating a welding application) subject to the following additional assumptions, namely:

That all resistive and inductive effects associated with the transformer as seen looking into the primary of the transformer are proportional to $N^2$ where N is the turns ratio.

That some resistance and inductance in the circuit are associated with the power source and are therefore independent of the transformer turns ratio.

That the capacitance effects are all in the primary and independent of the transformer turns ratio.

$$I_{ss \text{ peak primary}} \cong V\sqrt{\frac{C}{L_1+N^2L_T}} \frac{1}{\sin h(A)} \quad (25)$$

$$A = \left[\frac{\pi}{4}(R_1+N^2R_T)\sqrt{\frac{C}{L_1+N^2L_T}}\right]$$

$$I_{ss \text{ peak secondary}} \cong V \cdot N \sqrt{\frac{C}{L_1+N^2L_T}} \frac{1}{\sin h\left[\frac{\pi}{4}(R_1+N^2R_T)\sqrt{\frac{C}{L_1+N^2L_T}}\right]} \quad (26)$$

$$V_{c_{ss}} \cong V \frac{1}{\tan h\left[\frac{\pi}{4}(R_1+N^2R_T)\sqrt{\frac{C}{L_1+N^2L_T}}\right]} \quad (27)$$

where:

$R_1$ is power source resistance
$L_1$ is power source inductance
$N$ is transformer turns ratio
$R_T$ is total resistance of transformer and load as reflected to the transformer secondary
$L_T$ is total inductance of the transformer and load as reflected to the transformer secondary except magnetizing inductance which in this case is neglected.

Now with the following further assumptions, namely:

That the power source resistance and power source inductance may be neglected.

Also that $\sin hx$ and $\tan hx$ may be replaced by $x$. This is a good approximation when $x$ is small (less than 0.1) not so good for larger $x$. For example for $K=1.5$ and the switch closure time of 1 millisecond, $x$ is about 0.15.

$$I_{ss \text{ peak primary}} \cong V\frac{4}{\pi} \frac{1}{N^2R_T} \quad (28)$$

$$I_{ss \text{ peak secondary}} \cong V\frac{4}{\pi} \frac{1}{NR_T} \quad (29)$$

$$V_{c_{ss}} \cong V\frac{4}{\pi} \frac{1}{NR_T}\sqrt{\frac{C}{L_T}} \quad (30)$$

A formula will be determined which gives the numerical value of C for a given load inductance, a turns ratio and a pulse duration.

Additional assumptions: The duration of the current pulse $T = $ a constant.

$$T = \frac{\pi}{\beta}$$

$$T \cong \frac{\pi}{\sqrt{\frac{1}{LC}}}$$

where $$L = L_1 + N^2L_T$$

$$\sqrt{C} \cong \frac{T}{\pi\sqrt{L}} \quad (31)$$

ignoring the value of the power source inductance $L_1$, as above $$\sqrt{C} \cong \frac{T}{\pi N\sqrt{L_T}} \quad (31a)$$

Substituting Equation 31a into Equation 30 and rewriting Equations 28 and 29 for convenient reference, we obtain:

$$I_{ss \text{ peak primary}} \cong V\frac{4}{\pi} \frac{1}{N^2R_T} \quad (32)$$

$$I_{ss \text{ peak secondary}} \cong V\frac{4}{\pi} \frac{1}{NR_T} \quad (33)$$

$$V_{c_{ss}} \cong V\frac{4}{\frac{R_T}{L_T}T} \quad (34)$$

For many applications $R_T$ and $L_T$ will be fixed by the actual load that one must work with. If this is the case, then the selection of C is based on the pulse duration that one desires. This C is also influenced by the transformer turns ratio for any given T. This relationship is set forth in Equation 31a.

The peak voltage on the capacitor (likewise the peak voltage on the inductance, nearly the transformer primary voltage) is only a function, as a first order of approximation, to V, $R_T$, $L_T$ and T, of course, C will influence it but not for a constant T. This relationship is set forth in Equations 31a and 34. The peak secondary current as seen in Equation 33 is a function of N, V, and $R_T$. It is independent of L and C as a first order approximation. This is why the insertion of a sheet of steel into the throat of the welder does not appreciably influence the weld. In other words the pulse circuit of the present invention is a constant peak current device relative to any variations of L or C, within the limitations of the approximations made.

While the circuit parameters will vary according to the relationships above set forth to meet specific requirements, in the preferred embodiment of the invention elsewhere referred to herein and having a pulse duration of one millisecond the rate of build-up and decay of such pulse is equivalent to a wave having a frequency of 500 cycles per second. Hence, the circuit and transformer design are in such embodiment chosen accordingly.

Because of the short duration current pulse (relatively high frequency of the circuit as compared to the standard welding circuits) the size of the capacitor, which in this case is an element determining the pulse duration, is small compared to the size of capacitor used in ordinary welding circuits wherein the capacitor is not used as pulse duration control but is used only to correct the power factor. For the usual pulse welding application according to the present invention and where there is utilized a 230-volt source, the capacitors will be of a value on the order of 100 to 1000 microfarads and the voltage rating thereof will be at least 2000 volts. However it will be recognized that these numerical values are given solely for further illustration of one specific embodiment of the invention and they should be considered as illustrative only and in no sense limiting.

In general one of the problems which must be faced is a large inductance in comparison to the resistance and the pulse duration desired and in relation to the maximum voltage the switch must withstand and the maximum voltage the capacitor must withstand. Therefore usually it will be desirable to have a transformer with minimum leakage inductance. This needs a little clarification because of the presence of adjustable turns ratio in the transformer. Therefore, the statement of the transformer requirement may be stated as: provide the leakage inductance of the transformer when referred to the secondary to have as little inductance in comparison with the load inductance as possible.

Usually it is desirable to keep the resistive losses in the transformer to a minimum in order to reduce the cooling problem. However, if in a given case there is too much capacitor voltage, one may insert an external resistor somewhere where it is easy to cool. This of course lowers the overall efficiency.

The secondary winding of the transformer will not be greatly different from the secondaries presently used in welding transformers.

The parameter K is important as it indicates the peak steady state initial voltages which appear on the capacitor and inductance of the equivalent circuit. For all values of K between 1 and 2 the voltage on the capacitor will be greater than V and the peak voltage on the inductance will be greater than 2V. These are for the equivalent circuit. In most actual welding circuits where the line impedance is small it will be found that these will be nearly the values across the capacitor and the transformer primary. With K equal to 1.5 the peak capacitor voltage is approximately 3V and the peak voltage across the inductance is about 4V. The preferred effective range for K appears at present to be from about 1.33 to about 1.8.

The actual voltage across the welding electrodes will be a function of the peak transformer voltage, the transformer turns ratio and the distribution of the resistance and inductance between the transformer and the load. Appropriate values must be chosen in order to maintain safe voltages at the electrodes.

Eperimental results have indicated that for high values of K, as 1.8 or 1.9, that even more striking and desirable results are obtained along the lines of the advantages above set forth than have thus far been experienced with the smaller typical values of K, as 1.4 or 1.5, which have been used for safety purposes. Further, such experimental work has also shown that with K equalling 1.5, circuit parameters are established by which the advantages of the present circuitry above set forth are achieved to a high level of satisfaction without imposing any danger at all onto the operator over and above the danger, if any, inherent to any electrical welding apparatus and such as is commonly known and accepted in present practice.

*Operation*

Referring to the circuit of FIGURE 1, at some time during each half-cycle of the power source, which time is determined by the phase shift circuits, one or the other of the gas-filled tubes, tube 4 for example, will conduct to permit charging of capacitor 5 and such conduction will continue until the capacitor 5 reaches a potential such that the current flow tends to reverse through the gas-filled tube whereupon the tube is caused to cease conducting. This occurs even though the pulse occurs on the upslope side of the sine wave as in FIGURE 2. When a half-cycle of opposite polarity is impressed upon the tubes, the tube 6 conducts and effects first a discharge of the capacitor 5 and subsequently a charging thereof to the opposite polarity. This time, however, the charge on the capacitor is added, though not arithmetically, to the potential supplied by the source and hence the pulse supplied through the load is supplied in response to a potential substantially greater than the source potential at the point in the sine wave at which the pulses in question are caused to occur. Conduction of tube 6 is terminated in the same manner as discussed above with respect to tube 4.

Turning now to another aspect of the operation, a characteristic of this circuit is that if the initial voltage on the capacitor is zero when the sequence of switch closures is started it will be found that the initial voltage on subsequent closures will increase in magnitude. Ultimately some steady state initial voltage will be reached which is the maximum voltage that will occur on the capacitor. The time it takes to reach this steady state condition is a function of the values of L-R-C. The steady state initial voltage on the capacitor may be calculated by realizing that this state exists when the initial voltage on the capacitor at the beginning of one switch closure period is equal but of opposite polarity to the voltage which is on the capacitor at the end of the switch closure period. By the use of Equation 17 we can solve for the peak capacitor voltage ($V_{c_p}$) (the steady state initial voltage) and the result follows:

$$-V_{c_p} = V_{c_p} + (-V - V_{c_p})K \qquad (18)$$

$$2V_{c_p} = KV + KV_{c_p} \qquad (19)$$

$$(2-K)V_{c_p} = KV \qquad (20)$$

$$V_{c_p} = \left(\frac{K}{2-K}\right)V \qquad (21)$$

The peak voltage on the inductance will be the source voltage plus the peak capacitor voltage. This can be expressed in terms of K also and is given below:

$V_{L_p}$ = peak voltage across the inductance (total)

$$V_{L_p} = V_{c_p} + V$$

$$= \left(\frac{2}{2-K}\right)V \qquad (22)$$

Figure 15:
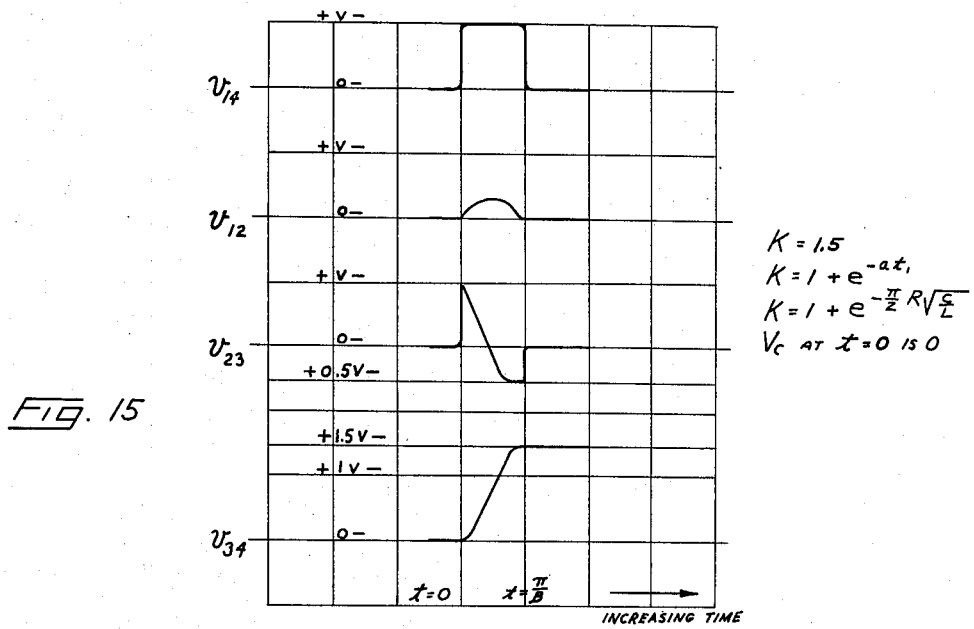
FIGURE 15 represents a typical set of curves showing the operation of apparatus of the invention during the time the switch is conducting and under circumstances wherein the hereinafter described "K" factor is equal to 1.5.

A typical set of curves which show what happens during the time the switch is conducting are shown in FIGURE 15.

Equation 21 can also be written as:

$$V_{c_p} = V \operatorname{ctn} h\left(\frac{\pi}{4}R\sqrt{\frac{C}{L}}\right)$$

From this, it can be seen that the effect of a change in R is greater on $V_{c_p}$ than is the effect of the same amount of change in either L or C. This is why the resistance of the primary winding of the transformer is held very low.

It will be recognized that, by suitable adjustment of the phase shift circuits, the tubes 4 and 6, respectively, can be rendered conductive at any desired point in the half-cycles of opposite polarity of the power source in a manner well known to the industry. However, some phase shift is essential to the successful operation of the present circuit inasmuch as potential must be available across the capacitor 5 and primary winding 9 immediately upon the conduction of the tubes 4 and 6. This further appears from the inspection of FIGURE 2 as described in the next paragraph following.

Figure 2:
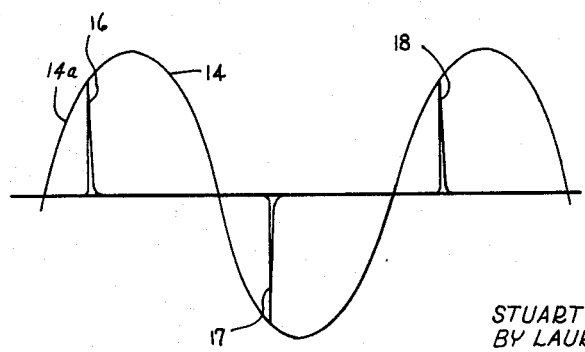
FIGURE 2 is a representation of a time-current diagram illustrating the current flow through the tubes to charge the capacitor, said flow being caused to occur at a point ahead of the peak of the sine wave.

In FIGURE 2, the line 14 indicates the potential supplied by the A.C. power source and the lines 16, 17 and 18 indicate the current flowing through the respective valves 4 and 6. The line 16, for example, indicates that current passing through one of the tubes which, for illustrative purposes may be taken as the tube 4, commences at a point approximately 60 degrees following the commencement of the half-cycle indicated by the portion 14a of the line 14 and continues until the charge on the capacitor 5 is such that the current flow through the valve 4 tends to reverse. At this point, current flow through the valve 4 ceases, even though the source voltage continues to rise, due to the disappearance of the minimum voltage differential across the principal electrodes.

Figure 3A:
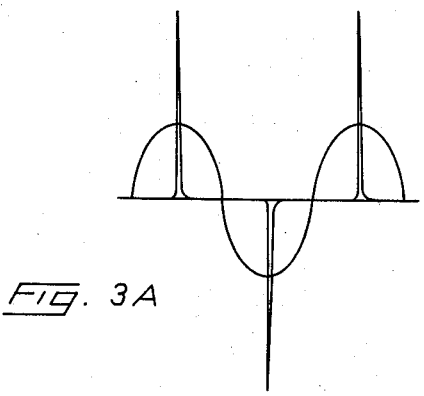
FIGURE 3a is a representation of the time-current diagram showing the pulse appearing at the peak of the sine wave supplied by the source.
Figure 3B:
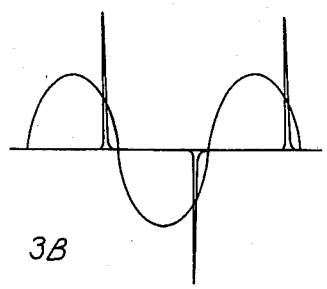
FIGURE 3b is a representation of the time-current diagram showing the pulse appearing at a point following the peak of the sine wave.
Figure 4:
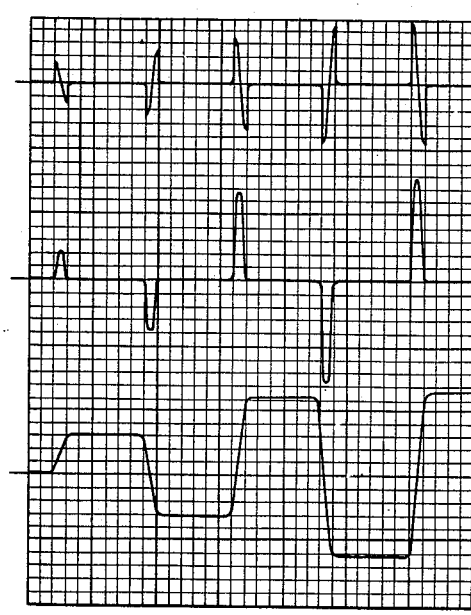
FIGURE 4 is a reproduction of oscillographs showing voltage through the transformer primary winding, current through the transformer primary winding and voltage on the capacitor in a given and typical embodiment of the invention.
Figure 3C:
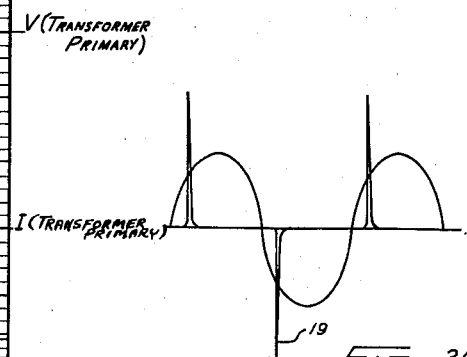
FIGURE 3c is a representation of the time-current diagram showing the pulse appearing ahead of the peak of the sine wave.

However, when the voltage reverses and the phase shift circuit 13 renders the tube 6 conductive, and assuming that said tube 6 also becomes conductive 60 degrees following the commencement of the half-cycle, the voltage of the capacitor 5 will be added to the voltage applied from the source to the tube 6, and, hence, the current through the welding transformer will be a function of the sum of the voltages of the capacitor and the source, as indicated by the line 19 in FIGURE 3c. As capacitor 5 discharges through the tube 6 and builds up a potential in the opposite sense, the current through the welding transformer will drop very rapidly and reach zero substantially immediately. Thus, the current through the welding transformer as shown by line I in FIGURE 4 reaches its maximum very quickly upon the tube 6 becoming conductive and then drops very rapidly to become zero immediately thereafter. This corresponds to the point where the capacitor 5 becomes fully charged in the opposite sense and blocks further flow of current through tube 6 in the same manner as above described with respect to tube 4.

Subsequent reversals of the polarity of the A.C. source will continue to create sharp pulses of power, each thereof being considerably in excess of that which would be created by the voltage of the source by itself, and each being of extremely short duration, the duration of each pulse being determined as set forth hereinafter.

While the phase shift circuits 12 and 13 need not, within the broader concept of the invention, be adjusted to produce the same amount of phase shift and hence the pulses need not be of the same magnitude in the respectively opposite directions, the usual use of the apparatus will make preferable equal phase shift from each of circuits 12 and 13 and hence equal pulses.

By properly adjusting the phase shift circuits, the pulses can be caused to occur at the peak of the sine wave supply, after the peak of the sine wave supply or before the peak of the sine wave supply and the resulting potentials applied to the load are shown in FIGURES 3a, 3b and 3c.

It was stated above that the magnitude of pulses appearing in the load is substantially greater than the voltage applied to the system. This appears to be because the voltage across the capacitor is added to the voltage applied to the system, although not necessarily arithmetically. For example, where said load is in part the primary winding of a welding transformer, careful measurement of the output of said transformer has in many instances shown a voltage appearing across said primary winding many times greater than the source voltage, such as, assuming an applied voltage of 240 volts and further assuming a system wherein $K=1.5$, a voltage of 1000 volts, 1400 volts or even much greater. Corresponding measurements across the capacitor have shown charges appearing on said capacitor appreciably greater than the voltage applied from the external source, such as in the same specific instance above mentioned where the externally applied voltage was 240 volts and $K=1.5$, the voltages across the capacitor were from 900–1200 volts.

The length of pulses derived from the circuitry embodying this invention may vary according to the requirements of the load within a limited range. Thus, where it is impracticable to provide extremely short pulses, they can be extended slightly in order to obtain the required value of energy applied to the work, but it appears that approximately one quarter cycle of a 60-cycle source is the maximum duration of the pulse which is effective. The preferred pulse length for present welding uses appears to be about one millisecond, but pulses of even shorter duration than one millisecond, as 100 microseconds, have some further desirable characteristics for at least certain applications than those pulses of one millisecond duration. Thus, while parameters of the circuit may be adjusted to control the pulse length within a range of about 100 microseconds to about four milliseconds, nevertheless, for the best practices of the invention, at least for welding applications, the pulses will be of the order of about one millisecond in duration.

The length of the pulse $$t = \frac{\pi}{\beta}$$

is determined by the relationship of inductance and capacitance. The following equation describes this:

$$\beta = \sqrt{\frac{1}{LC} - \frac{R^2}{4L^2}}$$

with R very small, the $$\frac{R^2}{4L^2}$$

can be neglected so that as a practical matter the following relationship will apply:

$$\beta \cong \sqrt{\frac{1}{LC}}$$

Inasmuch as the magnitude of the actual pulse delivered by the system is in part a function of a charge on the capacitor at the time said pulse commences, it is readily seen that the output pulses of the system can be caused to increase progressively, in a manner to provide upslope welding control, in either of at least two ways.

Figure 12:
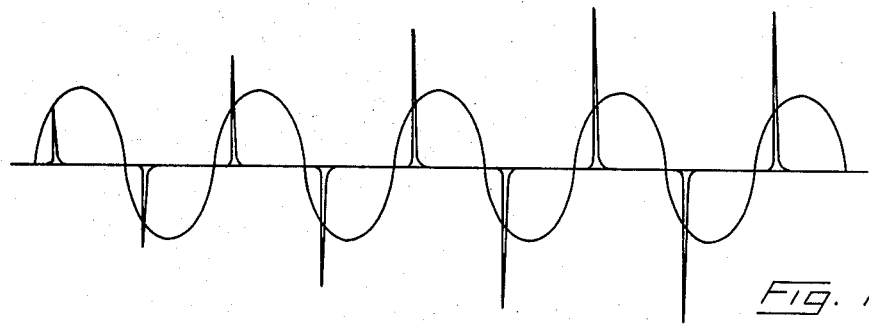
FIGURE 12 is a diagrammatic representation of the pulses developing from a condition of no previous charge on the capacitor and showing the manner of their increasing to the steady-state condition.

(a) The first of these assumes that the value of "K" is relatively high, such as 1.7 or even higher. Thus, capacitor voltage adds to source voltage through several pulses and the peak voltages thereupon progressively increase. This situation is illustrated in FIGURE 12 wherein the peaks of the several pulses are shown progressively increasing until they reach a steady state beyond which they will not go. This, however, is normally merely a beginning condition when the welding equipment is first started rather than one which can be utilized for control purposes. However, by partially discharging said capacitor between operations thereby varying the rate at which a charge on a capacitor is permitted to build up, this function as described can be utilized for control purposes.

(b) The more direct and simple method of controlling a build-up, and which can be used for tapering down said pulses as well, is by phase shift control. Since the output pulse is at least in part a function of the line voltage at the moment the pulse occurs, an upslope or a downslope in said output pulses can be obtained by phase shift control. For an upslope, the instant of pulse appearance is moved from a point near but not at the mere point of the supply sine wave toward the peak thereof. Downslope is obtained by opposite shifting. Thus, this method of supplying pulses is subject to precise control as to magnitude of such pulses solely by the phase shift circuitry and without varying any of the other values of the apparatus.

FIGURE 5 illustrates a modification adaptable to the production of a plurality of pulses from a single given sine wave of the supply. Here a plurality of circuits, each of which comprises a pair of back-to-back connected gas-filled tubes and connected in series with a capacitor, are connected in parallel with respect to each other and serially with respect to the load. The parts corresponding to the circuitry illustrated and described above in connection with FIGURE 1 are shown in FIGURE 5 with the same numerals as in FIGURE 1. Corresponding parts in the supplemental circuits appear with subscripts "a" and "b" associated therewith. Each of these separate capacitor-tube circuits functions independently of the other and each will produce a pulse in the load at a point in time determined by the phase shift setting applied to the control electrodes of the pair of gas-filled tubes utilized in each of the circuits. Thus, by suitable setting of the phase shift circuits, a series of pulses, here three, each supplied by one of the capacitor-tube circuits, may be caused to appear in the load and said pulses may be applied extremely closely together.

It will be recognized particularly that the number of such parallel-tube circuits and the magnitude of either the capacity or the inductance associated with said circuits will affect only the duration of the pulse and will not affect the magnitude of the pulse, this in each case being determined solely by the applied voltage and by the point in the sine wave at which the pulse occurs.

Figure 6:
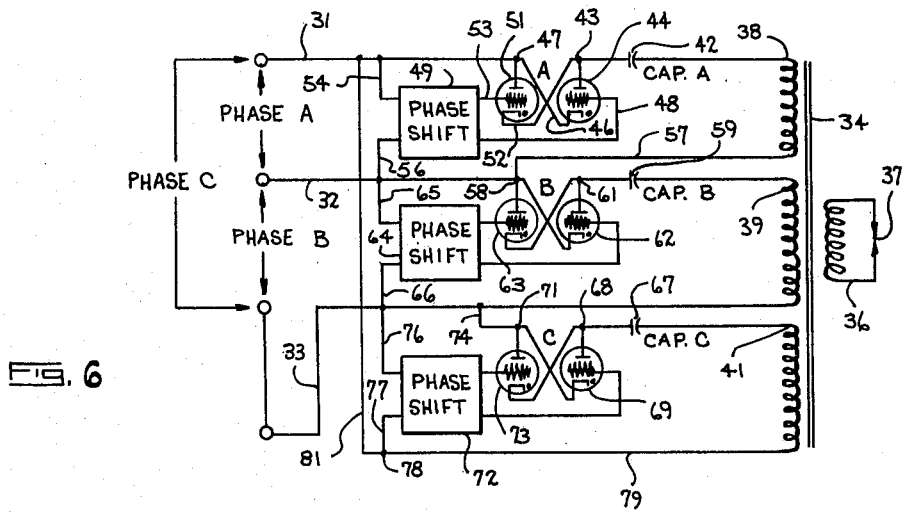
FIGURE 6 is a diagrammatic representation of a circuit embodying the invention and adapted for use with a delta-connected, multi-phase source.

Referring now to the circuitry shown in FIGURES 6 to 9, inclusive, which circuits are adaptable for use with multiphase sources, attention will first be directed to the circuit shown in FIGURE 6. In this circuit there is provided a three-wire, three-phase input including the input lines 31, 32 and 33. For convenience in reference hereinafter, phase A is designated existing between input lines 31 and 32, phase B between lines 32 and 33, and phase C between lines 31 and 33. A welding transformer 34 includes a secondary winding 36 connected in any conventional manner to electrodes generally indicated at 37. Said transformer also has primary windings 38, 39 and 41 of conventional form. The upper (as appearing in the drawings) end of the primary winding 38 is connected to one side of a power capacitor 42 whose other side is connected to a junction point 43. A gas-filled electric discharge device 44, which may conveniently be either a thyratron or an ignitron, has its anode connected to the junction point 43, its cathode connected by a conductor 46 to a junction point 47, and its control electrode connected by a conductor 48 to the output of a phase shift circuit 49. Said phase shift circuit may be of any convenient form and detailing thereof is accordingly unnecessary. A further gas-filled electric discharge device 51 which may likewise be either an ignitron or a thyratron, has its anode connected to the junction point 47, its cathode connected by a conductor 52 to the junction point 43 and its control electrode connected by a conductor 53 to another output of the phase shift device 49. The input of the phase shift device 49 is connected by a conductor 54 to one input, as the line 31, and the other input line 56 of the phase shift device 49 is connected to the other input line, as the line 32. The lower end of the secondary winding 38 is connected to a conductor 57 which is connected to the input line 32 at any convenient point, such as at the junction point 58.

The second primary winding 39 is connected to gas-filled electric discharge devices and which are in turn connected to a phase shift device in a manner generally similar to that above described in connection with the primary winding 38. The upper end of the primary winding 39 is connected to one side of a capacitor 59 whose other side is connected to a junction point 61. The gas-filled electric discharge device 62 has its anode connected to the junction point 61, its cathode connected to the junction point 58 and its control electrode connected to one output of the phase shift device 64, said latter phase shift device being of any conventional form. Electric discharge device 63 has its anode connected to the junction point 58, its cathode connected to the junction point 61 and its control electrode connected to the other output of the phase shift device 64. The input lines 65 and 66 of the phase shift device 64 are, respectively, connected to the source input lines 32 and 33. The electric discharge devices 62 and 63 may be generally similar to the corresponding devices 44 and 51 and may be thyratrons or ignitrons, as convenient. The other end of the primary winding 39 is connected to the source input line 33.

The third primary winding 41 is connected through a power capacitor 67 to the junction point 68. A gas-filled electric discharge device 69 has its anode connected to the junction point 68, and its cathode connected to a junction point 71 and its control electrode connected to one output of a conventional phase shift device 72. Another gas-filled electric discharge device 73 has its anode connected to the junction point 71, its cathode connected to the junction point 68 and its control electrode connected to another output of the phase shift device 72. The junction point 71 is connected by a conductor 74 to the source input line 33. Phase shift input line 76 is connected to the source input line 33 and the phase shift input line 77 is connected to the junction point 78. The other end of the primary winding 41 is connected by a conductor 79 to the junction point 78 which in turn is connected by a further conductor 81 to the source input line 31.

Assuming that a positive pulse is appearing on source input line 31 and that the phase shift circuit 49 is set to provide a positive pulse in the control electrode of tube 51 at a point 90 degrees following the commencement of the positive pulse appearing in source input line 31, in such case tube 51 is rendered conductive at said 90 degree point and said pulse then flows through the tube 51 to and through the capacitor 42 thence through first primary winding 38 and into the other side of phase A to source input line 32. As soon as capacitor 42 charges to the maximum potential of phase A, said current ceases to flow therethrough. With the parameters of the circuit being chosen to cause this to happen very rapidly, it will be recognized that a single sharp pulse appears in the first primary winding 38 and current then ceases to flow therein. Upon the appearance of a reverse potential in phase A, current flows in a reverse direction, this time through the tube 44 as soon as such flow is permitted by the phase shift circuit 49 acting on the control electrode of tube 44. Assuming that this phase shift circuit is set to provide a positive pulse in said last-named control electrode at approximately 90 degrees following the commencement of the reverse pulse, it will be recognized that said pulse will start at substantially the maximum voltage of phase A and, further, that this will be added to the voltage in the capacitor 42. Thus, the potential existing between the source input lines 31 and 32 will be substantially greater than the maximum potential of phase A.

At the end of said pulse, the capacitor 42 will remain charged in a polarity opposite to the polarity applied between source input lines 31 and 32 by the last-named pulse so that upon the occurrence of the next pulse in the first-named direction, the charge on said capacitor 42 will again supplement the voltage between source input lines 31 and 32 at the moment that conduction through the gas tube 51 commences. Assuming that the point at which said gas tube 51 conducts remains at approximately 90 degrees, the pulse through the first primary winding 38 will again be substantially greater than the magnitude of the maximum voltage appearing in phase A and will again be of very short duration.

This operation may proceed for so long as alternating pulses appear at the terminals associated with phase A.

The appearance of alternating pulses in phase B, that is, between input lines 32 and 33, will in a similar manner charge capacitor 59 in alternating directions under control of phase shift circuit 64 and thereby cause alternately directed pulses to appear in the primary winding 39. Each of said pulses will be of magnitude substantially greater than the maximum voltage of phase B, assuming that phase shift circuit 64 is similarly set for firing the tubes 62 and 63 at approximately 90 degrees following the commencement of the pulse in phase B and the duration of said pulses is similarly adjustable according to the capacity of the capacitor 59.

Further, in a similar manner, the appearance of pulses in phase C will cause alternately directed pulses substantially greater than the magnitude of the pulses in phase C to appear in the primary winding 41, again assuming that the phase shift 72 is set to fire the tubes 69 and 73 at approximately 90 degrees following the commencement of the pulses in phase C.

Figure 8:
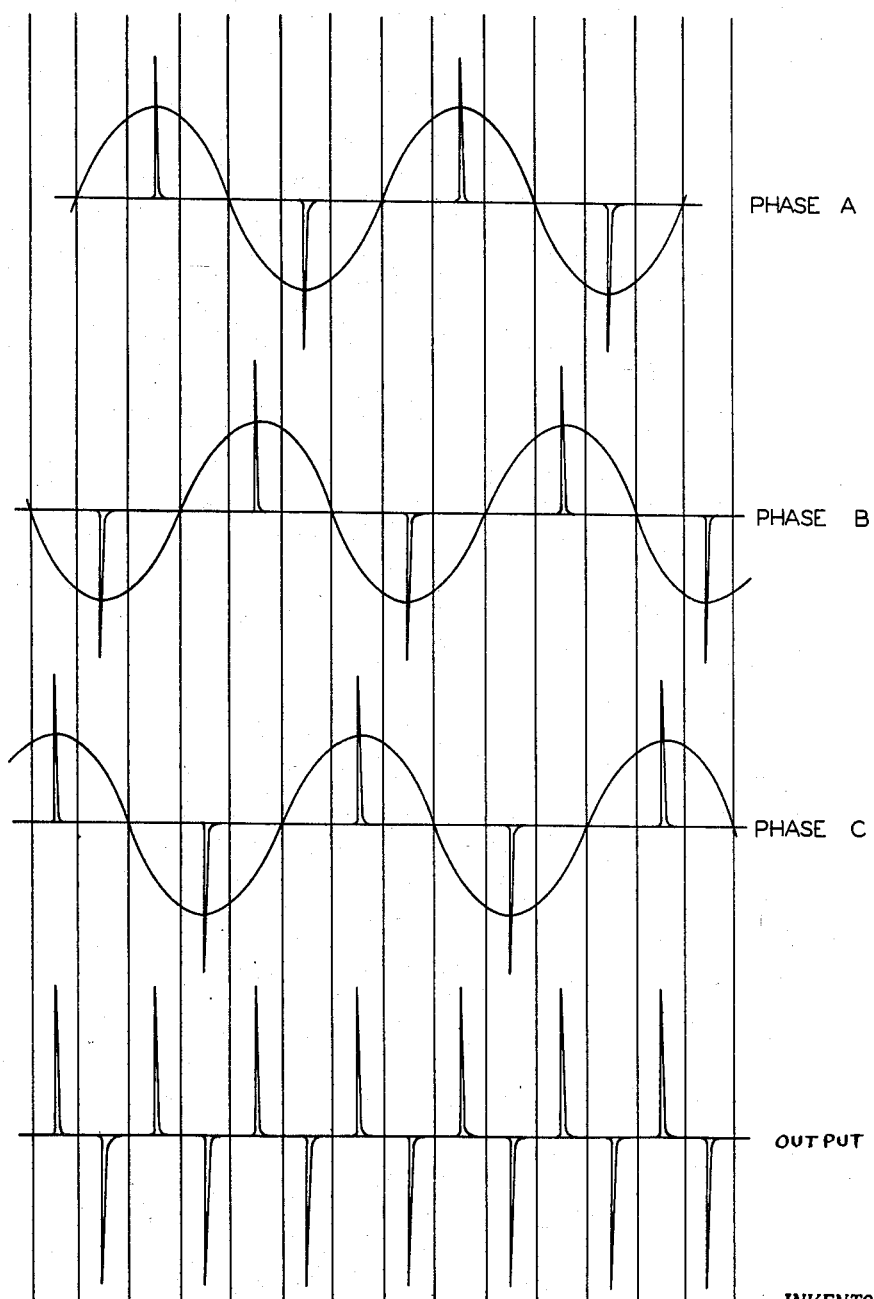
FIGURE 8 is a diagram illustrating the pulses obtained from each phase of input power from the circuitry shown in FIGURE 6, said pulses being shown in alignment with each other, together with a diagrammatic representation of the pulses of power appearing at the output of the circuitry.

Turning now to FIGURE 8, there is indicated the position and magnitude of the pulses in each of phases A, B, and C, both with respect to each other and with respect to the voltages appearing in the several sine waves appearing in the several sources.

The lower portion of FIGURE 8 shows all of the pulses brought together on a single line to represent the time relationships with respect to each other of the several pulses.

With the pulses as indicated in FIGURES 2 and 3, there is no overlapping between the pulses and hence there is no possibility of a conductive condition in any one phase shorting out or otherwise affecting the pulse generated in another phase. Therefore, the circuit described will provide individual pulses as shown wherein each pulse is separate from every other pulse, each output pulse is of magnitude substantially twice the magnitude of the source at the moment the output pulse occurs and the circuitry required employs no moving parts.

*Common Tapped (Y) Connection Supply*

While the above circuitry works satisfactorily for accomplishing the objectives above outlined, it nevertheless requires multiple primary windings to be provided in the welding transformer and as such has certain features of expense which it is desirable to reduce to the extent that same is possible without harming the operation of the apparatus. Thus, the following modified circuit has been developed to utilize a single center tapped primary winding and which can be used to accomplish all of the objectives above outlined in connection with the present invention wherever a four-wire Y-connected power source is available, or can be conveniently made available by presently known transformer conversion means of conventional kind.

Turning now to FIGURE 7 there is shown four source input lines 101, 102, 103, and 104. Line 104 is the common-connected line and the phases exist in lines 101, 102 and 103, respectively, each with respect to line 104 as indicated by the notations of phase A, phase B and phase C. A welding transformer 105 has a secondary winding 106 which is connected in any convenient manner to welding electrodes indicated generally at 107. Said welding transformer has a single primary winding 108 which is center tapped at 109 to divide it into two units. One end of one unit, namely, one end of the upper portion as appearing in the drawings, is connected in parallel to one side of each of the pairs of capacitors 111, 111a, 112, 112a, 113 and 113a. Each of said capacitors is connected at its other respective end through a pair of back-to-back connected gas-filled tubes. Thus, capacitor 111 is so connected to the tubes 114 and 115 and thence to the line 101, and capacitor 111a is similarly connected to the tubes 114a and 115a and thence to the line 101. The other side of capacitor 112 is similarly connected through a pair of tubes to the line 102 and the other side of capacitor 113 is similarly connected through a pair of tubes to line 103. The other side of the capacitor 112a is similarly connected through a pair of tubes to the line 102 and the other side of capacitor 113a is similarly connected through a pair of tubes to a line 103. Each of the several pairs of gas-filled tubes as above indicated has its respective control electrodes connected to the output terminals of phase shift units 116, 116a, 117, 117a, 118 and 118a.

The operation is generally similar to that described above in connection with the circuit of FIGURE 1 in that as pulses appear in the respective phases A, B and C a potential is placed across the respective capacitors 111, 111a, 112, 112a, 113 and 113a and accordingly, in the same manner as above described in connection with FIGURE 1, pulses substantially greater than the maximum magnitude of the source appear in the upper half of the primary winding 108.

The center tap of the primary winding 108 is connected to the line 104. Thus far, the description of the circuit of FIGURE 7 has been confined to that associated with the upper (as appearing in FIGURE 7) part of the transformer 105 and this portion of the circuit is entirely satisfactory where uni-directional pulses are desired. However, where multiple but alternatingly sensed pulses are desired, particularly where such pulses are to be supplied at a higher rate for the purpose of welding operations, this may be provided by the addition of further capacitors 121, 122 and 123. Such reversing of the pulses is often desirable for many well-known reasons, such as to prevent saturation of the transformer. These capacitors are connected to pairs of gas-filled electric discharge devices, said pairs being indicated at 126, 127 and 128. Said capacitors and electric discharge devices are connected to source input lines 101, 102 and 103 in the same manner as above described in more detail in connection with the above-described capacitors 111, 112, and 113 and the gas-filled tubes associated therewith. Thus, pulses appearing in lines 101, 102 and 103 charge the capacitors 121, 122 and 123 in the same manner as previously described in connection with FIGURE 1 and a further set of pulses are supplied to the lower half of the primary winding of the welding transformer.

Phase shift devices 129, 131 and 132 are provided for controlling the point of firing of the pairs of tubes 126, 127 and 128 in the same manner as above described in connection with corresponding parts of FIGURE 1.

The phase shift units 116, 117 and 118 will be set to produce a pulse at one desired point in the sine wave of the source, such as at 90 degrees and the phase shift units 116a, 117a and 118a will be set to produce pulses at another desired point in the source sine wave, such as at 130 degrees. The phase shift units 129, 131 and 132 are adjusted so that the pulses derived from the capacitors 121, 122 and 123 each occur respectively at a point between the pulses from the pairs of capacitors 111, 111a, 112, 112a, 113 and 113a, such as at 110 degrees.

Figure 9:
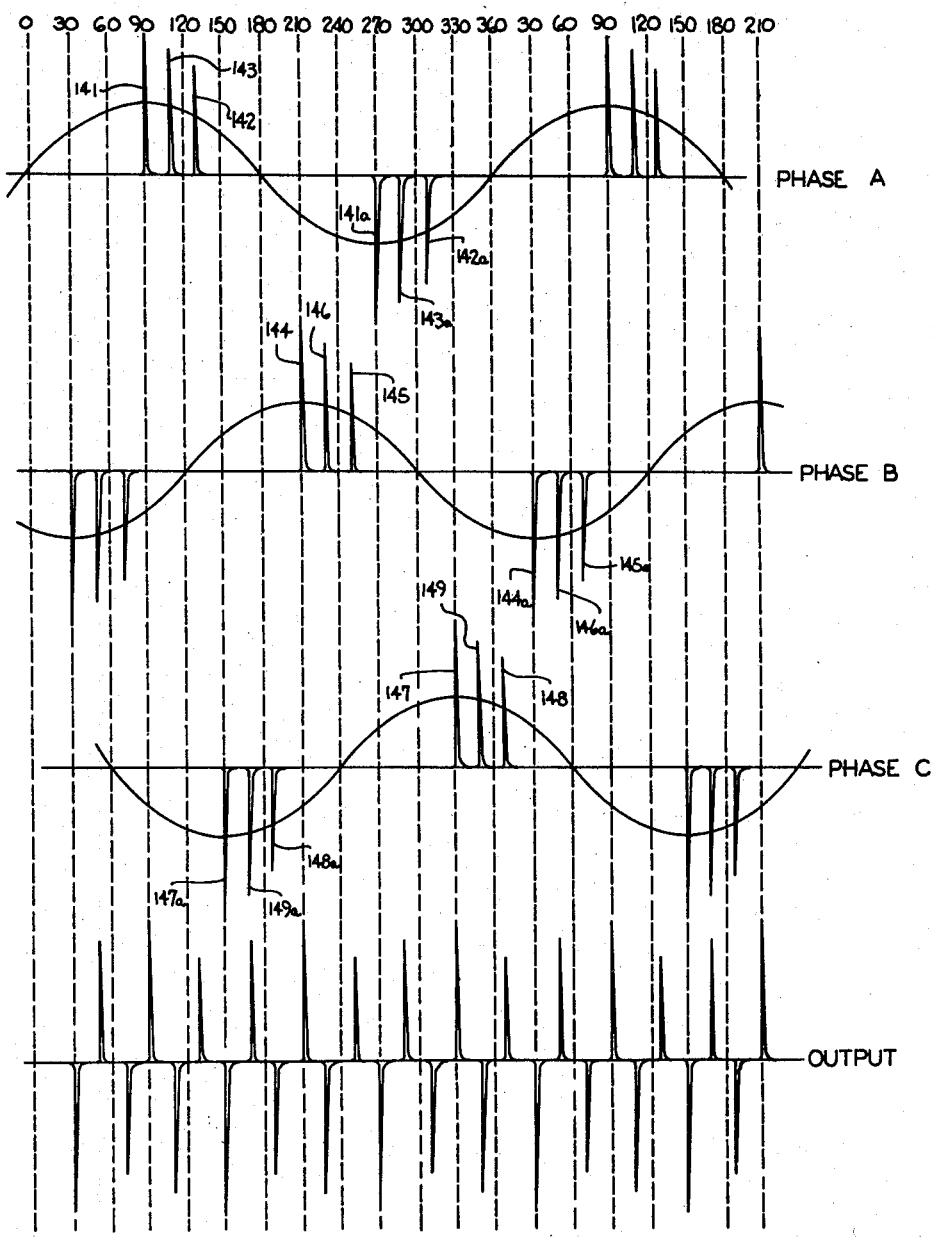
FIGURE 9 is a diagram illustrating the plural pulses obtained from each phase of input power from the circuitry shown in FIGURE 7, said pulses being shown in alignment with each other together with a diagrammatic representation of the pulses of power appearing at the output of the circuitry.

Thus, referring to FIGURE 9, there is shown on the lines marked Phase A, Phase B and Phase C the current pulses occurring in the several capacitors. The pulse 141 appearing at 90 degrees originates in the capacitor 111 and the pulse 143 originating in the capacitor 123 appears at 110 degrees and the pulse 142 appearing at 130 degrees originates in capacitor 111a. Pulses 141a, 142a and 143a originate in the capacitores 111, 111a, and 123 during the oppositely directed half-cycle from the phase A source.

Similarly, the pulse 144 originates in capacitor 112, the pulse 145 originates in capacitor 112a and the pulse 146 originates in capacitor 122, all associated with the phase B source and the reverse pulses 144a, 145a, and 146a are associated with said same capacitors, respectively, upon the opposite half-cycle from the phase B source.

Also similarly, the pulse 147 originates with capacitor 113, pulse 148 originates with the capacitor 113a and the pulse 149 originates with capacitor 121. The reverse pulses 147a, 148a and 149a originate with the same capacitors, respectively, upon the opposite half-cycle of the phase C source.

The output line in FIGURE 9 shows the output appearing in the secondary winding 106. Here it is shown that the pulses 143, 146 and 149 originating in the capacitors 123, 122, 121, respectively, are reversed by the action of the lower half of the primary winding 108 so that the composite output of the transformer is a plurality of alternating pulses as shown. With the arrangement here shown for a 60-cycle input, the output will supply 1080 pulses per second.

A further modification may be made with respect to a three-phase, three-wire input and same is illustrated in FIGURE 10. Here three separate transformers are used instead of a single transformer having three primary windings, as shown in FIGURE 6. The primary windings 38a, 39a and 41a are connected in the same manner as windings 38, 39 and 41, respectively, of FIGURE 6. Each of the secondary windings are connected to the load 107a, as a pair of welding electrodes, in the same manner as in the apparatus of FIGURE 6 but said secondaries are further connected in parallel so that regardless of which primary winding is energized at a given moment each of the secondary windings will be energized for energization of the load in the usual manner. This makes possible the use of standard transformers where same is more economical than to provide a special transformer of the nature indicated in FIGURE 6.

Where only uni-directional pulses are desired, it is wholly practicable to connect the secondary winding in the foregoing described circuits to a rectifier system and thence to the output terminals. Thus, in FIGURE 11, the secondary winding S, which can be the secondary winding of any of the transformers of FIGURES 1, 5, 6 or 7 (or whose output conductors can be the conductors 138 and 139 of FIGURE 10) is connected through any suitable rectifying system, as the bridge rectifier R, to the output conductors 151 and 152. This adaptation of the invention will find use in many places, such as plating, where uni-directional pulses of high frequency and considerable power-carrying ability are needed.

It will be observed in all forms of the circuitry above described maximum heat is obtained when the pulses are caused to occur at the peaks of the sine wave from the alternating source. Thus, unlike conventional phase shift heat control, maximum heat is obtained with a 90 degree phase shift between the instant that the ignitrons are rendered conductive as compared to the commencement of each wave of source voltage and heat may be diminished by a phase shift in either direction from the peaks of the supply waves.

In addition to the advantages set forth above for the method and apparatus of the invention, said method and apparatus have, among others, certain further advantages the mentioning of which will still further assist a full understanding of the invention:

Copper alloy metals have been welded to each other and have been welded to both aluminum and to steel.

Present welding equipment which is now adaptable only to the welding of steel can by use of conversion units embodying the present invention be readily adapted to the welding of aluminum, including relatively thin sheet aluminum.

Changing the position or the size of a workpiece in the throat of a given welding machine does not change the current flow between the electrodes. Hence current compensators are unnecessary.

The present system places primarily a resistive load on the supply power lines and, further, reduces the transients otherwise tending to go back to the power line.

This minimizing of the total heat required, following from its concentration at the exact point of use, makes it possible to weld relatively delicate items without damage thereto, such as transistor parts.

This same concentration of welding heat at the point of use, together with the resistive characteristics experienced in the welding circuitry, make it possible to weld successfully from supply lines of smaller capacity than was possible previously.

This circuit is adaptable to the use of an isolation transformer between the power supply and the welding circuit and thereby eliminates all likelihood of grounding of the welding circuit and the danger to the operator which sometimes results therefrom.

While a particular preferred embodiment of the invention has been disclosed herein, the invention contemplates such modifications or changes therein as lie within the scope of the appended claims.

What is claimed is:

1. A circuit for supplying electrical pulses to a load comprising the combination:
   a pair of source terminals and first conductive means for connecting same to a source of regularly reversing potential;
   a switch;
   a switch actuator for controlling said switch and operable to close same in desired relationship to reversals in polarity of said source, the switch being opened when current through said switch reaches a predetermined minimum level;
   capacitive and inductive energy storage devices and a resistive device, at least one thereof constituting said load, and second conductive means for connecting said energy storage and resistive devices in series with each other and with said switch and said source terminals;
   the parameters of said circuit conforming substantially to the formula:

$$K \cong 1 + e^{\left(-\frac{\pi}{2}R\sqrt{\frac{C}{L}}\right)}$$

wherein $e$ equals the natural logarithmic base, R equals the total resistance in all resistive components of the above-designated circuit including especially that of said energy storage devices, said switch, said resistive device and said conductive means, C equals the total capacitance of all capacitive components of the above designated circuit including at least that of said capacitive storage device, L equals the total inductance in all inductive components of the above-designated circuit including at least that of said inductive storage device and wherein K is of value between the integer 1 and the integer 2.

2. The device defined in claim 1 wherein said predetermined minimum level is substantially zero.

3. The circuit defined in claim 1 wherein K is of value over 1.33.

4. System for producing from a standard commercial source of alternating potential a plurality of separate, spaced power pulses of high amperage and very short duration and supplying same to a load, such as an electric welding or electro-plating device, comprising in combination:
   supply terminals connectible to said source;
   a capacitor;
   a transformer including said load in its secondary circuit;
   a switch comprising a pair of electric discharge devices connected in back-to-back relationship and phase-shift circuitry for rendering said switch conductive in desired relationship with the potential waves appearing between said terminals, the switch being rendered nonconductive when the current therethrough diminishes to a predetermined minimum level;
   conductive means connecting said capacitor, the primary winding of said transformer, said switch and said terminals all in series with each other;
   the capacitive, inductive, and resistive components of said foregoing named circuitry being related to each other according to the equation $$K \cong 1 + e^{\left(-\frac{\pi}{2}R\sqrt{\frac{C}{L}}\right)}$$

and wherein K is of value over 1.33 and wherein (1) $e$ equals the natural logarithmic base, (2) R equals the total resistance in all resistive components of the above designated circuit including at least the resistive components of said capacitor, said primary winding, said switch, said conductive means and the resistive effect as reflected to the primary winding of the total resistance in the secondary circuit including the load, (3) C equals the total capacitance of all capacitive components of the above-designated circuit and including the capacitance of said capacitor, and (4) L equals the total inductance in all inductive components of said above-designated circuit and including at least the leakage inductance of said transformer.

5. The circuitry of claim 4 wherein K=about 1.5.

6. The circuitry of claim 4 wherein K is between 1.33 and 1.8.

7. System for producing from a standard commercial multi-phase source of alternating potential a plurality of separate, spaced power pulses of high amperage and of very short duration, namely, of the order of 0.001 second and supplying same to a load, such as an electric welding or electro-plating device, comprising in combination:
   pairs of supply terminals each pair respectively connectible to one phase of said source;
   a first phase group including a capacitor, the primary winding means of a transformer, a switch comprising a pair of electric discharge devices connected in back-to-back relationship and phase-shift circuitry for rendering said switch conductive in desired relationship with potential waves appearing between one pair of said terminals, said switch being opened when the current therethrough diminishes to a predetermined minimum level;
   conductive means connecting said capacitor, the primary winding means of said transformer, said switch and said one pair of said terminals connectible to one phase of said source all in series with each other;
   other phase groups of similar capacitor, primary winding means, switch and phase shift circuitry, each group thereof connected with a different pair of said terminals, said switches being so related to each other that only one thereof is closed at any given time, and said primary winding means being inductively related to the secondary winding means of said transformer, said load being connected to said secondary winding means, the capacitive, inductive and resistive values in each of said groups being related to each other according to the equation $$K \cong 1 + e^{\left(-\frac{\pi}{2}R\sqrt{\frac{C}{L}}\right)}$$

and where K is of value over 1.33 for each of said phase groups and wherein (1) $e$ equals the natural logarithmic base, (2) R equals the total resistance in all resistive components associated together in any given one of said phase groups including at least the resistive components of said capacitor, said primary winding means, said switch, said conductive means and the resistive effects reflected to the primary winding means of the total resistance in the secondary circuit including the load, (3) C equals the total capacitance in all capacitive components associated together in any given one of said phase groups including at least the capacitance of said capacitor, and (4) L equals the total inductance in all inductive components associated together in any given one of said phase groups and including at least the leakage inductance of said primary winding means and said secondary winding means.

8. A pulse-generating circuit adapted primarily for welding uses and operable in connection with a multi-phase source, comprising in combination:

a transformer having primary winding means and secondary winding means, a load connected to said secondary winding means;

a capacitor for each phase of input power, a pair of back-to-back connected gas-filled electric discharge devices for each phase of input power, circuitry connecting each pair of said discharge devices serially with one respectively of said capacitors and further means connecting said last-named circuitry serially between the primary winding means of said transformer and one phase of said power source;

phase shift circuitry units each having input and output terminals, the output terminals of each of said phase shift circuitry units being connected, respectively, with the control electrodes of one pair of electric discharge devices and the input terminals of each of said phase shift circuitry units being respectively connected across the phase source respectively associated with the pair of discharge devices to which a given phase shift circuitry unit is connected, said pairs of electric discharge devices being so related to each other that only one pair may operate at any given time;

whereby each of said phase shift circuitry units associated with a given capacitor will effect the discharge of pulses corresponding to the magnitude and timing of a given phase into the primary winding means of said transformer, and pulses of controllable timing and magnitude and corresponding to each of said power source phases will appear in the secondary winding means of said transformer;

the capacitive, inductive and resistive values in each of the phase groups comprising the primary winding means, a capacitor and a pair of electric discharge devices being related to each other according to the equation $$K = 1 + e^{\left(-\frac{\pi}{2}R\sqrt{\frac{C}{L}}\right)}$$

wherein K is of a value between about 1.33 and about 1.8 for each of said phase groups and wherein (1) $e$ equals the natural logarithmic base, (2) R equals the total resistance in all resistive components associated together in any given one of said phase groups including at least the resistive components of said capacitor, said primary winding means, said pair of electric discharge devices and the resistive effects reflected to the primary winding of the total resistance in the secondary winding means including the load, (3) C equals the total capacitance in all capacitive components associated together in any given one of said phase groups including at least the capacitance of said capacitor, and (4) L equals the inductance in all inductive components associated together in any given one of said phase groups and including at least the leakage inductance of said primary winding means and said secondary winding means.

9. A pulse-generating circuit adaptable for electric welding uses and applicable to a multi-phase, alternating potential, delta-connected, power source, comprising in combination:

a welding transformer having a plurality of primary windings and secondary winding means;

a load connected to said secondary winding means;

a plurality of capacitors equal in number to the number of said primary windings and a plurality of pairs of back-to-back connected gas-filled electric discharge devices, said pairs being equal in number to the number of said capacitors, and the number of said primary windings being equal to the number of phases of the power source;

electric circuitry connecting each of said capacitors serially with one pair of back-to-back connected discharge devices and further circuitry connecting said discharge devices and capacitor serially with one of said primary windings and with one phase of said power source to constitute a plurality of phase groups;

phase shift circuitry units equal in number to the number of pairs of discharge devices and each having input and output terminals, the input terminals of each phase shift circuitry unit being connected to one phase of said power source and the output terminals of each of said units being connected respectively to the control electrodes of the discharge devices of that pair of discharge devices serially associated with the phase of the power source to which the input terminals of a given phase shift unit are connected, said pairs of electric discharge devices being so related to each other that only one pair may operate at any given time;

whereby pulses are fed successively to said primary windings, each pulse corresponding to a half cycle appearing across one phase of the power source;

the capacitive, inductive and resistive values in each of said phase groups being related to each other according to the equation $$K = 1 + e^{\left(-\frac{\pi}{2}R\sqrt{\frac{C}{L}}\right)}$$

wherein K is of a value between about 1.33 and 1.8 for each of said phase groups and wherein (1) $e$ equals the natural logarithmic base, (2) R equals the total resistance in all resistive components associated together in any given one of said phase groups including at least the resistive components of said capacitor, said primary winding, said pair of discharge devices and the resistive effects reflected to the primary winding of the total resistance in the secondary winding means including the load, (3) C equals the total capacitance in all capacitive components associated together in any given one of said phase groups including at least the capacitance of said capacitor, and (4) L equals the total inductance in all inductive components associated together in any given one of said phase groups and including at least the leakage inductance of said primary winding and said secondary winding means.

10. A pulse-generating circuit for use with a multi-phase, alternating potential, Y-connected source, comprising in combination:
  a transformer having primary and secondary windings, said secondary winding being connected to a load;
  a plurality of capacitors, said capacitors being equal in number to the number of phases of the source;
  a plurality of pairs of back-to-back connected gas-filled electric discharge devices, the number of said pairs being equal to the number of capacitors and circuitry connecting each pair of discharge devices and a capacitor in series with respect to each other;
  circuitry connecting the side of each of said capacitors respectively opposite its associated pair of discharge devices to each other and to one end of the primary winding of said transformer and further circuitry connecting those terminals of each pair of back-to-back connected discharge devices which are opposite the capacitor which is connected thereto to one of the source terminals associated with one phase of said source so that said capacitor, said pair of discharge devices, and said primary winding define a phase group, there being a phase group connected to each phase of said source;
  circuitry connecting a portion of the primary winding of said transformer spaced from said one end thereof to the common terminal of said multi-phase source, and a plurality of phase-shift circuitry units, said last-named units being equal in number to the number of said pairs of discharge devices, each having a pair of output terminals and a pair of input terminals, the output terminls of each of said units being respectively connected to the control electrodes of a pair of said discharge devices and the input terminals of said phase-shift units being connected respectively across that phase to which its associated pair of discharge devices is connected, said pairs of discharge devices being so related to each other that only one pair may operate at any given time, whereby pulses corresponding to half-cycles appearing in each phase of the source but which are of greater magnitude than the maximum potential of each half-cycle and which are of short lengths, are applied to said primary winding;
  the capacitive, inductive and resistive values in each of said phase groups being related to each other according to the equation $$K = 1 + e^{\left(-\frac{\pi}{2}R\sqrt{\frac{C}{L}}\right)}$$

wherein K is a value between about 1.33 and 1.8 for each of said phase groups and wherein (1) $e$ equals the natural logarithmic base, (2) R equals the total resistance in all resistive components associated together in any given one of said phase groups including at least the resistive components of said capacitor, said primary winding, said pair of discharge devices and the resistive effects reflected to the primary winding of the total resistance in the secondary winding including the load, (3) C equals the total capacitance of all capacitive components associated together in any given one of said phase groups including at least the capacitance of the capacitor, and (4) L equals the total inductance in all inductive components associated together in any given one of said phase groups and including at least the inductance of the primary winding and said secondary winding.

11. A pulse-generating circuit applicable for use with a multi-phase, alternating potential, power source having an individually energized phase terminal for each phase and a single common terminal; comprising in combination:
  a transformer having a centrally-tapped primary winding and having a secondary winding connected to a load;
  a plurality of capacitors, said capacitors being equal in number to a multiple of the number of phases of said source;
  a plurality of pairs of back-to-back connected gas-filled discharge devices, said pairs being equal in number to the number of said capacitors;
  means serially connecting each of said capacitors to one respectively of said pairs of discharge devices;
  circuitry connecting that end of selected ones of said capacitors opposite to the ends of said capacitors connected to said discharge devices to one end of said primary winding, further circuitry connecting the ends of each of said pairs of discharge devices opposite to the ends connected to said selected capacitors, respectively, to one of said phase terminals, each phase terminal having an equal number of said pairs of discharge devices connected thereto;
  a conductor connecting the center tap on said primary winding to said common terminal;
  circuitry connecting the ends of the remaining capacitors opposite to their respectively connected pairs of discharge devices to each other and to the other end of said primary winding;
  circuitry connecting the ends of each of said pairs of discharge devices opposite to the ends connected to said remaining capacitors, respectively, to one of said phase terminals all of said prenamed circuitry together with the capacitors, discharge devices and said primary winding constituting a plurality of phase groups corresponding to each phase of said source;
  phase shift circuitry units, said units being independent of each other and equal in number to the number of said pairs of discharge devices and each of said units having a pair of output terminals and a pair of input terminals, said output terminals of each of said units being connected respecively to the control electrodes of a pair of said discharge devices and the input terminals being connected one to the phase source terminal connected to the pair of discharge devices to which said output terminals of a given unit are connected and the other of said input terminals for each of said units being connected to said common terminal, said pairs of discharge devices being so related to each other that only one pair may operate at any given time whereby pulses of a magnitude in excess of the magnitude of potential appearing on said phase terminals and controllable in time by the phase shift units associated with a given capacitor and equal in number to twice the number of said capacitors will appear in the primary winding of said transformer during a given cycle of one phase of said power source;
  the capacitive, inductive and resistive values in each of said phase groups being related to each other according to the equation $$K \cong 1 + e^{\left(-\frac{\pi}{2}R\sqrt{\frac{C}{L}}\right)}$$

wherein K is of a value between about 1.33 and about 1.8 for each of said phase groups and wherein (1) $e$ equals the natural logarithmic base, (2) R equals the total resistance in all resistive components associated together in any given one of said phase groups including at least the resistive components of said capacitor, said primary winding, said pair of discharge devices and the resistive effects reflected to the primary winding of the total resistance in the secondary winding including the load, (3) C equals the total capacitance in all capacitive components associated together in any given one of said phase groups including at least the capacitance of said capacitor, and (4) L equals the total inductance in all inductive components associated together in any given one of said phase groups and including at least the leakage inductance of said primary winding and said secondary winding.

12. The circuit defined in claim 1 wherein K is of value between 1.33 and 1.8.

References Cited in the file of this patent
UNITED STATES PATENTS

| | | |
|---|---|---|
| 1,281,454 | White | Oct. 15, 1918 |
| 2,040,969 | Redmond | July 7, 1936 |
| 2,389,351 | Faulk | Nov. 20, 1945 |
| 2,440,309 | Strickland | Apr. 27, 1948 |
| 2,585,772 | Hasley et al. | Feb. 12, 1952 |
| 2,681,428 | Rockafellow | June 15, 1954 |
| 2,739,281 | Rockafellow | Mar. 20, 1956 |

UNITED STATES PATENT OFFICE
CERTIFICATE OF CORRECTION

Patent No. 3,143,698                        August 4, 1964

Stuart C. Rockafellow, deceased, by
Laura M. Rockafellow, executrix

It is hereby certified that error appears in the above numbered patent requiring correction and that the said Letters Patent should read as corrected below.

Column 2, line 44, for "ignition" read -- ignitron --; column 10, line 75, after "positive", second occurrence, insert -- provided --; column 11, line 26, for "$2_\pi f$" read -- $2\pi f$ --.

Signed and sealed this 29th day of December 1964.

(SEAL)
Attest:

ERNEST W. SWIDER
Attesting Officer

EDWARD J. BRENNER
Commissioner of Patents